United States Patent
Pan et al.

(10) Patent No.: US 9,309,372 B2
(45) Date of Patent: Apr. 12, 2016

(54) RUBBER COMPOSITIONS INCLUDING A FUNCTIONALIZED WAX

(71) Applicants: Xiao-Dong Pan, Guangzhou (CN); Yaohong Chen, Akron, OH (US); Mindaugas Rackaitis, Massillon, OH (US); James D. Ulmer, Akron, OH (US); Nicole Capitos-Davis, Akron, OH (US)

(72) Inventors: Xiao-Dong Pan, Guangzhou (CN); Yaohong Chen, Akron, OH (US); Mindaugas Rackaitis, Massillon, OH (US); James D. Ulmer, Akron, OH (US); Nicole Capitos-Davis, Akron, OH (US)

(73) Assignee: Bridgestone Corporation, Tokyo (JP)

(*) Notice: Subject to any disclaimer, the term of this patent is extended or adjusted under 35 U.S.C. 154(b) by 40 days.

(21) Appl. No.: 13/782,731

(22) Filed: Mar. 1, 2013

(65) Prior Publication Data

US 2013/0231426 A1 Sep. 5, 2013

Related U.S. Application Data

(60) Provisional application No. 61/605,278, filed on Mar. 1, 2012.

(51) Int. Cl.
| | | |
|---|---|---|
| C08J 3/22 | (2006.01) | |
| C08K 5/24 | (2006.01) | |
| A63B 37/00 | (2006.01) | |
| C08K 3/34 | (2006.01) | |
| B60C 1/00 | (2006.01) | |
| C08K 5/00 | (2006.01) | |
| C08L 9/06 | (2006.01) | |
| C08L 21/00 | (2006.01) | |

(52) U.S. Cl.
CPC ............. *C08K 5/0008* (2013.01); *B60C 1/0016* (2013.04); *C08K 5/0025* (2013.01); *C08L 9/06* (2013.01); *C08L 21/00* (2013.01)

(58) Field of Classification Search
None
See application file for complete search history.

(56) References Cited

U.S. PATENT DOCUMENTS

| | | | | |
|---|---|---|---|---|
| 2,122,278 | A * | 6/1938 | Clark | ............................ 570/134 |
| 2,894,926 | A | 7/1959 | Jackson | |
| 4,148,737 | A | 4/1979 | Liston et al. | |
| 4,371,633 | A | 2/1983 | Soltysyk | |
| 4,987,632 | A | 1/1991 | Rowe et al. | |
| 5,202,041 | A | 4/1993 | Traverso et al. | |
| 5,529,891 | A | 6/1996 | Wang et al. | |
| 5,531,256 | A | 7/1996 | Hashimoto et al. | |
| 5,658,975 | A | 8/1997 | Ulman et al. | |
| 5,866,171 | A | 2/1999 | Kata | |
| 5,876,527 | A | 3/1999 | Tsuruta et al. | |
| 5,931,211 | A | 8/1999 | Tamura | |
| 5,971,046 | A | 10/1999 | Koch et al. | |
| 6,608,145 | B1 | 8/2003 | Lin et al. | |
| 7,169,831 | B2 | 1/2007 | Helland et al. | |
| 7,576,155 | B2 | 8/2009 | Wang et al. | |
| 7,750,073 | B2 | 7/2010 | Brahms et al. | |
| 7,838,583 | B2 | 11/2010 | Kojima | |
| 7,960,463 | B2 | 6/2011 | Pan et al. | |
| 8,613,800 | B2 * | 12/2013 | Wilhelm et al. | ............... 106/415 |
| 2003/0220428 | A1 | 11/2003 | Wendling et al. | |
| 2003/0220430 | A1 | 11/2003 | Rawlinson et al. | |
| 2003/0236333 | A1 | 12/2003 | Rawlinson et al. | |
| 2004/0097633 | A1 * | 5/2004 | Robert et al. | .................. 524/492 |
| 2005/0032951 | A1 | 2/2005 | Bechthold et al. | |
| 2005/0288422 | A1 * | 12/2005 | Burns et al. | .................... 524/469 |
| 2006/0292096 | A1 | 12/2006 | Yu | |
| 2009/0278293 | A1 | 11/2009 | Yoshinaka et al. | |
| 2011/0098378 | A1 * | 4/2011 | Wang et al. | .................... 523/156 |

OTHER PUBLICATIONS

Dover Chemical Corporation; Chlorez 700; Solid Chlorinated Paraffin (dated Apr. 13, 2012).
Dover Chemical Corporation; Chlorinated Paraffins Typical Analysis (dated Dec. 1997).
Wacker; Material Safety Data Sheet, Version 1.8 (dated Dec. 22, 2011).
Wacker; Product Sheet, W 23 Silicone.
Wacker; Wacker W 23 Technical data Sheet, Version 1.0 (dated Feb. 27, 2008).
Phoenix Chemical, Inc.; Pecosil—Silicones-Organofunctional.
Phoenix Chemical, Inc.; The Pecosil FST Series, Data Sheet (dated Jan. 19, 2007).
Phoenix Chemical, Inc.; Pecosil AS and ARS Series, Data Sheet (dated Jan. 12, 2005).
Gary E. LeGrow et al. Alkylmethylsiloxanes: "A Novel Family of Silicone-Organic Hybrid Polymers for the Cosmetic Industry" (dated Oct. 1992).
Dow Corning; Product Information Sheet, SW-8005 C30 Resin Wax (dated Feb. 17, 2009).
ToKo; Tech Manual Nordic (dated 2010/2011).
Dow Corning; Product Information Sheet, 2-5088 Wax.
Dover Chemical Corporation; PAROIL 63-NR Chlorinated Olefin Extreme Pressure, Flame Retardant, Plasticizer (Jul. 13, 2012).

(Continued)

*Primary Examiner* — Susannah Chung
*Assistant Examiner* — Robert T Butcher
(74) *Attorney, Agent, or Firm* — Meredith E. Hooker; Jenny L. Sheaffer

(57) ABSTRACT

Disclosed herein are rubber compositions suitable for use in tire treads comprising (a) at least one conjugated diene polymer or copolymer; (b) at least one filler; (c) a curative package; and (d) at least one of: (i) from 0.2 to 10 phr of at least one halogenated hydrocarbon wax, or (ii) from 0.2 to 10 phr of at least one silicone-containing wax comprising a functionalized polyalkylsiloxane, a functionalized polyalkylsilsesquioxane resin, or combinations thereof. In certain embodiments, the at least one halogenated hydrocarbon wax is a chlorinated hydrocarbon or a fluorinated hydrocarbon wax.

17 Claims, No Drawings

(56) References Cited

OTHER PUBLICATIONS

Dover Chemical Corporation; PAROIL 10-NR Chlorinated Paraffin Extreme Pressure Additive (Jul. 13, 2012).
Dover Chemical Corporation; PAROIL 150-LV Chlorinated paraffin Extreme Pressure Additive (Jul. 16, 2012).
Dover Chemical Corporation; Dover Liquid Chlorinated Parraffins.
Dover Chemical Corporation; Paroil Liquid Chlorinated Parraffins (copyright 2011), from http://www.doverchem.com/Products/Paroil%C2%AELiquidChlorinatedParaffins.aspx (last accessed Feb. 25, 2013).
Product Specification for Melamine from Sigma-Aldrich, available at http://www.sigmaaldrich.com/catalog/product/aldrich/m2659?lang=en&region=US (downloaded Oct. 1, 2015).

* cited by examiner

RUBBER COMPOSITIONS INCLUDING A FUNCTIONALIZED WAX

CROSS-REFERENCE TO RELATED APPLICATION

This application claims priority to and any other benefit of U.S. Provisional Patent Application Ser. No. 61/605,278, filed Mar. 1, 2012, and entitled "RUBBER COMPOSITIONS INCLUDING A FLUORINATED HYDROCARBON WAX OR A SILICONE-CONTAINING WAX," the entire disclosure of which is incorporated by reference herein.

FIELD OF THE INVENTION

The disclosure relates to rubber compositions that include a fluorinated hydrocarbon wax, a silicone-containing wax, or a chlorinated hydrocarbon wax, where the rubber composition is generally suitable for use in tires.

BACKGROUND

Rubber tires employing tire treads have been used for more than one century. In such tires, the tire tread provides the interface between the tire and the road surface and, thus, is important to the traction performance of the tire. Particularly useful for certain applications are tire treads with excellent wet traction performance. However, due to numerous complex factors involved, such as the hysteretic bulk deformation of the tread rubber induced by road surface asperities, the rate of water drainage between the tread rubber and the road, lubrication by trapped water or other possible lubricants, and the possible adhesive interactions between the tread rubber and the road, the quantitative mechanisms attributable to improved wet traction performance are not completely understood.

The present disclosure relates to the surprising discovery that the use of fluorinated hydrocarbon waxes, silicone-containing waxes, or chlorinated hydrocarbon waxes to replace all or a portion of a conventional wax in a rubber composition allows for the alteration of the hydrophilic/hydrophobic properties of the rubber composition. This alteration of the hydrophilic/hydrophobic properties of the rubber composition can contribute to enhancing the wet skid resistance of the rubber formed from such composition. Moreover, the use of fluorinated hydrocarbon waxes, silicone-containing waxes, or chlorinated hydrocarbon waxes as disclosed herein to replace all or a portion of a conventional wax in a rubber composition does not significantly impact the bulk mechanical properties of the rubber composition as compared those of a rubber composition formed with the conventional wax.

SUMMARY OF THE INVENTION

The present disclosure provides rubber compositions suitable for use in tires. In certain embodiments, the present disclosure provides rubber compositions suitable for use in tire treads comprising at least one conjugated diene polymer or copolymer containing at least one conjugated diene monomer and optionally at least one vinyl-containing monomer; at least one filler in an amount of 5 to 200 phr, wherein a majority of the filler is carbon black, silica or a combination thereof; a curative package; and at least one of (i) from 0.2 to 10 phr of at least one halogenated hydrocarbon wax, or (ii) from 0.2 to 10 phr of at least one silicone-containing wax comprising a functionalized polyalkylsiloxane, a functionalized polyalkylsilsesquioxane resin, or combinations thereof.

In certain embodiments, the halogenated hydrocarbon wax is a chlorinated hydrocarbon wax or a fluorinated hydrocarbon wax.

In certain embodiments, the present disclosure provides rubber compositions suitable for use in a tire tread comprising at least one conjugated diene polymer or copolymer comprising at least one conjugated diene monomer and optionally at least one vinyl-containing monomer, at least one filler, a curative package, and a halogenated hydrocarbon wax where the halogen is fluorine and the wax is utilized in an amount of from 0.2 to 10 phr.

In certain other embodiments, the present disclosure provides rubber compositions suitable for use in a tire tread comprising at least one conjugated diene polymer or copolymer comprising at least one conjugated diene monomer and optionally at least one vinyl-containing monomer; at least one filler; a curative package; and from 0.2 to 10 phr of at least one silicone-containing wax comprising a functionalized polyalkylsiloxane, a functionalized polyalkylsilsesquioxane, or combinations thereof.

In certain other embodiments, the present disclosure provides rubber compositions suitable for use in a tire tread comprising at least one conjugated diene polymer or copolymer comprising at least one conjugated diene monomer and optionally at least one vinyl-containing monomer, at least one filler, a curative package, and a halogenated hydrocarbon wax where the halogen is chlorine and the wax is utilized in an amount of from 0.2 to 10 phr of at least one chlorinated hydrocarbon wax.

In certain other embodiments, it is contemplated to use 0.2 to 10 phr of at least one fluorinated hydrocarbon wax; 0.2 to 10 phr of at least one silicone-containing wax; 0.2 to 10 phr of at least one chlorinated hydrocarbon wax; or combinations thereof in the rubber compositions disclosed herein.

Other aspects of the present disclosure will be apparent from the description that follows.

DETAILED DESCRIPTION

The present disclosure is directed to rubber compositions suitable for use in tires. In accordance with certain embodiments, the rubber compositions disclosed herein are suitable for use in tire treads and comprise at least one conjugated diene polymer or copolymer comprising at least one conjugated diene monomer and optionally at least one vinyl-containing monomer; at least one filler in an amount of 5 to 200 phr, wherein a majority of the filler is carbon black, silica or a combination thereof; a curative package; and (i) from 0.2 to 10 phr of at least one halogenated hydrocarbon wax, or (ii) from 0.2 to 10 phr of at least one silicone-containing wax. In certain embodiments, the halogenated hydrocarbon wax is a chlorinated hydrocarbon wax or a fluorinated hydrocarbon wax.

Generally, tire rubber compositions are prepared from various combinations of elastomers such as conjugated diene polymer or copolymers; fillers; a curative package; and, amongst other conventional additives, waxes. The waxes typically used in such rubber compositions are hydrocarbon waxes, such as microcrystalline wax, paraffin wax, and the like. These hydrocarbon waxes are referred to herein as "conventional waxes." The conventional wax helps to protect the vulcanized rubber composition from degradation, specifically degradation due to oxidation and ozonolysis. The conventional wax will migrate to the outer surface of the vulcanized rubber composition and form a protective layer over the rubber. This protective layer, in turn, impedes the oxidation and ozonolysis that can cause degradation and deterioration of the vulcanized rubber (often accompanied by a "browning" of the rubber) to occur during the lifetime of the tire.

As mentioned above, the conventional waxes used in tire rubber compositions are hydrocarbon waxes, such as microcrystalline wax, paraffin wax, and the like. Paraffin waxes are generally unbranched $C_{20}$ to $C_{40}$ alkane waxes. Microcrystalline waxes are hydrocarbon waxes that generally have a higher percentage of isoparaffinic and naphthenic groups than paraffin waxes and also have a smaller crystalline structure as compared to the paraffin waxes. In general, the amount of conventional wax used in tire rubber compositions ranges from 0.2 to 10 phr (parts per hundred of rubber, by weight). More commonly, the amount of conventional wax used is from 1 to 2 phr.

The rubber compositions disclosed herein replace all or part of the conventional wax used in tire rubber compositions with a fluorinated hydrocarbon wax, a silicone-containing wax, or a chlorinated hydrocarbon wax. In certain embodiments, the rubber compositions replace all of the conventional wax used in tire rubber compositions with a chlorinated hydrocarbon wax; in other words, in such embodiments, the rubber composition does not contain any conventional wax. In accordance with certain embodiments, the surfaces of the vulcanized rubbers prepared from the rubber compositions disclosed herein exhibit an adjusted relative hydrophobicity or hydrophilicity as compared to the surfaces of vulcanized rubbers formed from rubber compositions prepared using the same composition, but using conventional waxes instead of the fluorinated hydrocarbon, the silicone-containing, or the chlorinated hydrocarbon wax(es).

The adjustment of the relative hydrophobicity or hydrophilicity of the rubber surface can contribute to the enhancement of the wet traction performance of a tire tread made with the rubber compositions disclosed herein. As mentioned above, due to numerous complex factors involved, the quantitative mechanisms attributable to improved wet fraction performance are not completely understood. However, in combination with other of the complex factors involved, the adjusted relative hydrophobicity or hydrophilicity can act to enhance the wet traction performance, particularly, the wet skid resistance of a tire tread made from the rubber compositions disclosed herein. For example, tire treads having surfaces that are hydrophobic will tend to repulse the water at the tread surface and will likely facilitate the water drainage from between the tire tread's surface and the road surface. Conversely, tire treads that have a hydrophilic surface will tend to attract water and are more likely to form "adhesive" capillary bridges between the tire tread's surface and the road surface. Thus, by adjusting the relative hydrophobicity or relative hydrophilicity as compared to a vulcanized rubber made from the same composition but with conventional wax instead of the fluorinated hydrocarbon wax, the silicone-containing wax, or the chlorinated hydrocarbon wax, the rubber compositions disclosed herein can contribute to the enhancement of the wet skid resistance of the tire tread. Moreover, the use of the fluorinated hydrocarbon wax(es), the silicone-containing wax(es), or the chlorinated hydrocarbon wax(es) do not significantly affect certain important bulk mechanical properties of such rubber, including but not limited to properties directed to dynamic viscoelasticity and tensile strength.

In certain embodiments, the rubber compositions disclosed herein include 0.2 to 10 phr of at least one fluorinated hydrocarbon wax. Suitable types of fluorinated hydrocarbon waxes for use in the rubber compositions disclosed herein include hydrocarbon waxes having a perfluorocarbon segment, e.g., a hydrocarbyl segment in which all hydrogens have been replaced with fluorine atoms along the carbon chain. An example of this type of wax is a block copolymer having a perfluorocarbon block segment and a hydrocarbon block segment. In certain embodiments of this type of fluorinated wax, the block copolymer is represented by the general formula $F_3C-(CF_2)_m-(CH_2)_n-CH_3$, where m is an integer ranging from 1 to 40, n is an integer ranging from 3 to 40, and n+m must be greater than 18. Thus, in one embodiment, the fluorinated hydrocarbon wax used in the rubber compositions disclosed herein is a block copolymer having a perfluorocarbon block segment and a hydrocarbon block segment.

In certain embodiments of rubber compositions disclosed herein, the hydrocarbon segment of the fluorinated wax is a paraffin segment, i.e., an unbranched alkane chain having from 20 to 40 carbon atoms. Thus, in one embodiment, n in the general formula described above ranges from 20 to 40. In accordance with certain embodiments of the rubber compositions disclosed herein, the fluorinated hydrocarbon wax is a fluorinated paraffin wax.

Suitable fluorinated hydrocarbon waxes used in the rubber compositions disclosed herein include from 0.2% to 70% by weight fluorine based on the total weight of the wax. In certain embodiments, the fluorinated hydrocarbon wax used includes from 0.2 to 12% by weight fluorine, or from 1% to 8% by weight fluorine. In certain embodiments, the rubber compositions disclosed herein comprise from 0.2 to 10 phr, preferably from 0.5 to 5 phr of at least one fluorinated hydrocarbon wax. Accordingly, because suitable fluorinated hydrocarbon waxes that are utilized may contain varying amounts of fluorine, it should be understood that the total amount of fluorination added to the rubber composition can be varied by adjusting the amount (phr) of fluorinated wax added to the rubber composition and/or the fluorine content of the fluorinated wax added to the rubber composition. Therefore, the total amount of fluorination added to the rubber composition may vary from 0.0004 phr to 5 phr (parts fluorine per hundred parts rubber). In certain embodiments, the amount of fluorination added to the rubber composition is from 0.004 to 1.2 phr, from 0.004 to 0.6 phr, from 0.04 to 1.2 phr, from 0.04 to 0.6 phr, from 0.1 to 1.2 phr, from 0.1 to 0.6 phr, from 0.2 to 1.2 phr or from 0.2 to 0.6 phr.

Based upon general mixing processes commonly used for preparation of the tire rubber composition, it is desirable that the fluorinated hydrocarbon waxes are solid at room temperature, which hereinafter is defined as temperatures ranging from 20° C. to 25° C. Thus, fluorinated hydrocarbon waxes are preferably solid at temperatures ranging from 20° C. to 25° C. In certain embodiments, the fluorinated hydrocarbon waxes are solid at temperatures up to 130° C. Although not preferred, the fluorinated waxes can also be liquid or in gel form at room temperature.

In one or more embodiments, the rubber compositions disclosed herein include 0.2 to 10 phr of at least one silicone-containing wax. Suitable types of silicone-containing waxes include functionalized polyalkylsiloxanes, functionalized polyalkylsilsesquioxane resins, and the like.

The functionalized polyalkylsiloxanes used as the silicone-containing wax in the rubber compositions disclosed herein, include, but are not limited to functionalized polydimethylsiloxanes represented by following two general formulas:

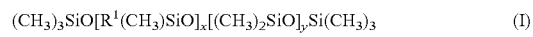
(I)

or

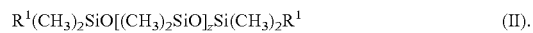
(II).

where x is an integer from 1 to 1000; where y is an integer from 0 to 1000; where z is an integer from 1 to 1000; and where $R^1$ has from 9 to 45 carbon atoms, and $R^1$ is selected from an aliphatic group, an aralkyl group, or a perfluorocarbyl group. Thus, suitable types of functionalized polydimethylsiloxanes include, but are not limited to, a polydimethylsiloxane functionalized with at least one aliphatic group having from 9 to 45 carbon atoms, a polydimethylsiloxane functionalized with at least one perfluorocarbyl group having from 9 to 45 carbon atoms, a polydimethylsiloxane functionalized with at least one aralkyl group having from 9 to 45 carbon atoms, and combinations thereof. In certain embodiments, the functional groups can be pendant groups (i.e., side chains) as shown in formula I, end groups as shown in formula II, or combinations thereof.

Examples of suitable aliphatic functional polydimethylsiloxanes used as the silicone-containing wax in the rubber compositions disclosed herein include, but are not limited to, alkyl functional polydimethylsiloxanes such as cetyl polydimethylsiloxanes, stearyl polydimethylsiloxanes, behenyl polydimethylsiloxanes, cerotyl polydimethylsiloxanes, and the like; alkenyl functional polydimethylsiloxanes; and alkynyl functional polydimethylsiloxanes. In each of these waxes, the aliphatic functional group, i.e., the alkyl group, the alkenyl group, or the alkynyl group, has from 9 to 45 carbon atoms.

Examples of suitable perfluorocarbyl functional polydimethylsiloxanes used as the silicone-containing wax in the rubber compositions disclosed herein include, but are not limited to, perfluoroalkyl functional polydimethylsiloxanes having from 9 to 45 carbon atoms. In one or more embodiments, the perfluoroalkyl functional polydimethylsiloxanes used in the rubber compositions disclosed herein include other functional groups such as carboxyl groups. Particular non-limiting examples of perfluorocarbyl functional polydimethylsiloxanes include perfluorononylethyl carboxydecyl lauryl dimethicone (e.g., PECOSIL FST-412 available from Phoenix Chemical, Inc. of Somerville, N.J.), perfluorononylethyl carboxydecyl lauryl/behenyl dimethicone (e.g. PECOSIL FST-41222 available from Phoenix Chemical, Inc.), perfluorononylethyl carboxydecyl behenyl dimethicone (e.g., PECOSIL FST-422 available from Phoenix Chemical, Inc.), and perfluorononylethyl carboxydecyl hexacosyl dimethicone (e.g., PECOSIL FST-426 available from Phoenix Chemical, Inc.).

Examples of suitable aralkyl functional polydimethylsiloxanes used as the silicone-containing wax in the rubber compositions disclosed herein include, but are not limited to, phenylalkyl functional polydimethylsiloxanes having from 9 to 45 carbon atoms. Particular examples of such phenylalkyl functional polydimethylsiloxanes include phenylisopropyl dimethicone (e.g., PECOSIL ARS-09 available from Phoenix Chemical, Inc.) and lauryl phenylisopropyl dimethicone (e.g., PECOSIL ARS-12 available from Phoenix Chemical, Inc.).

In certain embodiments, the functionalized polyalkylsilsesquioxane resins used as the silicone-containing wax in the rubber compositions disclosed herein are polymers having a polyalkylsilsesquioxane structure that can be represented by the general formula $R^2SiO_{3/2}$, where $R^2$ is an alkyl group and has from 1 to 6 carbon atoms. Thus, examples of the functionalized polyalkylsilsesquioxane polymers include, but are not limited to, functionalized polymethylsilsesquioxanes, functionalized polyethylsilsesquioxanes, functionalized polypropylsilsesquioxanes, functionalized polybutylsilsesquioxanes, functionalized polypentylsilsesquioxanes, and functionalized polyhexylsilsesquioxanes.

In accordance with one or more embodiments, the functionalized polyalkylsilsesquioxane resins are based upon the polyalkylsilsesquioxane polymers disclosed herein (e.g., $R^2SiO_{3/2}$) and include at least one functional group represented by the general formula $R^3(CH_3)_2SiO_{1/2}$, where $R^3$ is an alkyl group and has from 9 to 45 carbon atoms. In accordance with certain embodiments, preferably, $R^3$ is an alkyl group and has from 30 to 45 carbon atoms.

Moreover, in certain embodiments, the aforementioned polyalkylsilsesquioxane polymer containing the at least one $R^3(CH_3)_2SiO_{1/2}$ functional group further includes at least one functional group represented by the general formula $R^4R^5SiO_{2/2}$, where $R^4$ is selected from the group consisting of an alkyl group having from 1 to 45 carbon atoms, an alkenyl group having from 2 to 45 carbon atoms, an alkynyl group having from 2 to 45 carbon atoms, a hydroxyl group, sulfhydryl groups, ester groups, ether groups, and acid groups; and where $R^5$ is selected from the group consisting of an alkyl group having from 1 to 45 carbon atoms, an alkenyl group having from 2 to 45 carbon atoms, an alkynyl group having from 2 to 45 carbon atoms, a hydroxyl group, sulfhydryl groups, ester groups, ether groups, and acid groups.

In accordance with certain embodiments of the rubber composition disclosed herein, the rubber compositions comprise from 0.2 to 10 phr, preferably from 0.5 to 5 phr of the at least one silicone-containing wax. In certain embodiments, the silicone-containing wax used in the rubber compositions disclosed herein is selected from functionalized polyalkylsiloxanes, functionalized polyalkylsilsesquioxanes, and combinations thereof.

Based upon general mixing processes used for the preparation of the tire rubber composition, it is desirable that the silicone-containing waxes are solid at room temperature. Thus, the silicone-containing waxes are preferably solid at temperatures ranging from 20° C. to 25° C. In certain embodiments, the silicone-containing waxes are solid at temperatures up to 130° C. Although not preferred, the silicone-containing waxes can also be liquid or in gel form at room temperature.

In certain embodiments, the rubber compositions disclosed herein include 0.2 to 10 phr of at least one chlorinated hydrocarbon wax. Suitable types of chlorinated hydrocarbon waxes for use in the rubber compositions disclosed herein include hydrocarbon waxes having chlorocarbon segment, e.g., hydrocarbon segments in which some or all hydrogens have been replaced with chlorine atoms along the carbon chain. In certain embodiments, the chlorinated hydrocarbon wax is a chlorinated paraffin wax. Suitable, but non-limiting, examples of chlorinated hydrocarbon waxes suitable for use in the rubber compositions disclosed herein include Chlorez® chlorinated waxes (available from Dover Chemical Corporation, Dover, Ohio) such as Chlorez 700, Chlorez 700-S, Chlorez 760, Chlorez 700-DD, Chlorez 700-SS, and Chlorez 700-SSNP; Chloroflo 40 (available from Dover Chemical Corporation, Dover, Ohio), Paroil chlorinated oils (available from Dover Chemical Corporation, Dover, Ohio) such as Paroil 150-LV, Paroil 10-NR and Paroil 63-NR). Notably, as used herein, the term chlorinated hydrocarbon wax should be considered to include compounds that are solids at room temperature (such as the Chlorez® series chlorinated waxes, identified above) and compounds that are oils at room temperature (such as the Paroil series chlorinated oils, identified above), unless it is clear from the context that only compounds that are solid at room temperature are intended.

Suitable chlorinated hydrocarbon waxes used in the rubber compositions disclosed herein include from 30-75% by weight chlorine based on the total weight of the wax, preferably from 40 to 75% by weight chlorine. In certain embodiments, the rubber compositions disclosed herein comprise from 0.2 to 10 phr, preferably from 0.5 to 5 phr, or 1 to 5 phr of at least one chlorinated hydrocarbon wax. Accordingly, because suitable chlorinated hydrocarbon waxes that are utilized may contain varying amounts of chlorine, it should be understood that the total amount of chlorination added to the rubber composition can be varied by adjusting the amount (phr) of chlorinated hydrocarbon wax added to the rubber composition and/or the chlorine content of the chlorinated hydrocarbon wax added to the rubber composition. Therefore, the total amount of chlorination added to the rubber composition may vary from 0.005 to 7.5 phr (parts chlorine per hundred parts rubber in the rubber composition). In certain embodiments utilizing chlorinated hydrocarbon wax, the amount of chlorination added to the rubber composition is from 1 to 4 phr.

Based upon general mixing processes used for the preparation of tire rubber compositions, it is desirable that the chlorinated hydrocarbon wax is a solid at room temperature. Thus, the chlorinated hydrocarbon waxes are preferably solid at temperatures ranging from 20° C. to 25° C. In certain embodiments, the chlorinated hydrocarbon waxes are solid at temperatures up to 130° C. Although not preferred, the chlorinated hydrocarbon waxes can also be liquid (oil) or in gel form at room temperature.

In certain embodiments, the halogenated hydrocarbon wax is a brominated hydrocarbon wax and is present in an amount of 0.2 to 10 phr. In other embodiments, the halogenated hydrocarbon wax is a brominated hydrocarbon wax and is present in an amount of 0.5 to 5 phr. Various types of brominated hydrocarbon waxes may be suitable for use in the embodiments disclosed herein, including those containing various weight percentages of bromine such as 20-75% by weight based upon the weight of the wax, alternatively 35-75% by weight based upon the weight of the wax. Suitable, but non-limiting, examples of brominated hydrocarbon waxes suitable for use in the rubber compositions disclosed herein include Doverguard® brominated waxes (available from Dover Chemical Corporation, Dover, Ohio), such as Doverguard® 8207-A, Doverguard® 8208-A, and Doverguard® 8408. Notably, certain of these waxes include both chlorine and bromine and, accordingly, as noted in other portions of this disclosure, it should be considered to be within the scope of the disclosure to include a combination of chlorinated hydrocarbon wax and brominated hydrocarbon wax (either as separate waxes or via introduction of one wax containing both chlorine and bromine).

In certain embodiments, the halogenated hydrocarbon wax is a iodated wax and is present in an amount of 0.2 to 10 phr. In other embodiments, the halogenated hydrocarbon wax is a iodated hydrocarbon wax and is present in an amount of 0.5 to 5 phr. Various types of iodated hydrocarbon waxes may be suitable for use in the embodiments disclosed herein, including those containing various weight percentages of iodine such as 20-75% by weight based upon the weight of the wax, alternatively 35-75% by weight based upon the weight of the wax.

In accordance with one embodiment, it is contemplated that the rubber compositions may include a combination of at least one fluorinated hydrocarbon wax as disclosed herein, at least one silicone-containing wax as disclosed herein, and at least one chlorinated hydrocarbon wax. Thus, in accordance with this embodiment, the rubber compositions disclosed herein comprise at least one conjugated diene polymer or copolymer containing at least one conjugated diene monomer and optionally at least one vinyl-containing monomer, at least one filler, a curative package, at least one fluorinated hydrocarbon wax, at least one silicone-containing wax, and at least one chlorinated hydrocarbon wax. In this embodiment, the at least one fluorinated hydrocarbon wax, the at least one silicone-containing wax, and the at least one chlorinated hydrocarbon wax used in the rubber composition are present in a total combined amount of from 0.2 to 10 phr, preferably from 0.5 to 5 phr. In such embodiments, the at least one fluorinated hydrocarbon wax, the at least one silicone-containing wax, and the at least one chlorinated hydrocarbon wax include, but are not limited to, those described in paragraphs 15-30 herein.

In accordance with one embodiment, it is contemplated that the rubber compositions may include a combination of at least two of: at least one fluorinated hydrocarbon wax as disclosed herein, at least one silicone-containing wax as disclosed herein, and at least one chlorinated hydrocarbon wax. Thus, in accordance with this embodiment, the rubber compositions disclosed herein comprise at least one conjugated diene polymer or copolymer; at least one filler; a curative package; and at least two of at least one fluorinated hydrocarbon wax, at least one silicone-containing wax, and at least one chlorinated hydrocarbon wax. In this embodiment, the fluorinated hydrocarbon wax, the silicone-containing wax, and the chlorinated hydrocarbon wax used in the rubber composition are present in a total combined amount of from 0.2 to 10 phr, preferably from 0.5 to 5 phr. In such embodiments, the at least one fluorinated hydrocarbon wax, the at least one silicone-containing wax, and the at least one chlorinated hydrocarbon wax include, but are not limited to, those described in paragraphs 15-30 herein.

In accordance with certain embodiments, the rubber compositions disclosed herein further include a conventional wax in addition to the at least one fluorinated hydrocarbon wax, the at least one silicone-containing wax, or combinations thereof. In other embodiments, when the rubber composition utilizes at least one chlorinated hydrocarbon wax, the rubber composition does not contain any conventional wax. In other words, all of the wax contained within such rubber composition is chlorinated hydrocarbon. Examples of suitable conventional waxes for use in the rubber compositions disclosed herein include hydrocarbon waxes, such as microcrystalline waxes, paraffin waxes, and the like. In certain embodiments, the conventional wax includes a microcrystalline wax, a paraffin wax, and combinations thereof. In accordance with one or more embodiments, the conventional wax can be added to the rubber composition in an amount up to 10 phr, such that the total amount of all waxes, i.e., the conventional wax along with the at least one fluorinated hydrocarbon wax, the at least one silicone-containing wax, or combinations thereof, does not exceed 10 phr.

As mentioned above, the rubber compositions disclosed herein include at least one conjugated diene polymer or copolymer comprising at least one conjugated diene monomer and optionally at least one vinyl-containing monomer. Such conjugated diene polymers and conjugated diene copolymers can be derived, for example, from the polymerization of one or more of the following conjugated diene monomer units 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof.

In certain embodiments, suitable conjugated diene polymers and conjugated diene copolymers used in the tire rubber compositions disclosed herein can be derived from the polymerization of one or more of the conjugated diene monomers disclosed above and one or more vinyl aromatic hydrocarbon monomers. Examples of suitable vinyl aromatic hydrocarbon monomers include, but are not limited to styrene, α-methylstyrene, p-methylstyrene, o-methylstyrene, p-butylstyrene, vinylnaphthalene, and combinations thereof.

Examples of suitable conjugated diene polymers and conjugated diene copolymers for use in the rubber compositions disclosed herein include, but are not limited to, polyisoprene, polybutadiene, butadiene-isoprene copolymer, butadiene-isoprene-styrene copolymer, isoprene-styrene copolymer, styrene-butadiene copolymer, natural rubber, butyl rubber, halogenated butyl rubber, and combinations thereof. In accordance with the rubber compositions disclosed herein, the rubber compositions comprise a combined amount of 100 phr of the at least one conjugated diene polymer or copolymer.

In certain embodiments, the conjugated diene polymer or copolymer (as described above) within the rubber composition is functionalized with a functional chemical group at one end, both ends, or along the backbone of the polymer or copolymer. In certain embodiments, the conjugated diene polymer or copolymer is functionalized or coupled with a tin or silica-containing compound such as with tin tetrachloride, dibutyl tin chloride, or with another suitable compound, non-limiting examples of which include cyclic amines, polyisocanates, cyclic ureas, a silyl chloride, polyisocyanates, carbodiimides, polyepoxides, and alkoxysilanes.

The rubber compositions disclosed herein include at least one filler. Generally, any filler(s) conventionally used to prepare rubber compositions can be used in the rubber compositions described herein. Examples of suitable fillers used in the rubber compositions disclosed herein include, but are not limited to, reinforcing fillers such as carbon black; silica; mineral fillers such as clay (e.g., hydrous aluminum silicate), exfoliated clay, talc (hydrous magnesium silicate), aluminum hydrate (Al(OH)$_3$), and mica; as well as metal oxides such as aluminum oxide; titanium dioxide, and the like. Additional useful fillers suitable for use in the rubber compositions disclosed herein are known to those skilled in the art.

As previously discussed, in certain embodiments, the amount of the at least one filler that is contained within the rubber composition is 5-200 phr, wherein a majority of the filler is carbon black, silica or a combination thereof. In certain such embodiments, the 5-200 phr of at least one filler is selected from the group consisting of carbon black, silica, clay, metal oxides, and combinations thereof, keeping in mind that a majority of the filler is carbon black, silica or a combination thereof. In certain embodiments, the amount of the at least one filler that is contained within the rubber composition is 5-100 phr, and a majority of the filler is carbon black, silica or a combination thereof. In such embodiments the 5-100 phr of at least one filler is selected from the group consisting of carbon black, silica, clay, metal oxides, and combinations thereof. In certain embodiments where the rubber composition contains 0.5-10 phr (or alternatively 0.5 to 5 phr) of at least one chlorinated hydrocarbon wax, the rubber composition contains 5-100 phr of at least one filler; in certain such embodiments, the 5-100 phr of at least one filler is selected from the group consisting of silica, clay, metal oxides, and combinations thereof (i.e., the at least one filler excludes carbon black), wherein a majority of the filler is carbon black, silica or a combination thereof.

Examples of suitable types of carbon blacks used as the filler in certain embodiments of the tire rubber composition disclosed herein include furnace blacks, channel blacks, and lamp blacks. More specifically, examples of suitable carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other examples of suitable carbon blacks include, but are not limited to, acetylene blacks. Furthermore, a mixture of two or more of the aforementioned carbon blacks can be used as the filler in certain embodiments of the tire rubber composition disclosed herein. The grades of the carbon blacks suitable for use in certain embodiments of the rubber compositions disclosed herein are those characterized by ASTM D-1765, such as N-110, N-134, N-220, N-339, N-330, N-351, N-550, N-660, and N990 grades. Other grades of carbon black may also be suitable for use in certain embodiments of the rubber compositions disclosed herein, either alone, in combination or in combination with the previously listed grades of carbon black.

The carbon blacks used in accordance with embodiments of the tire rubber composition disclosed herein can be in a pelletized form or an unpelletized flocculent mass. For more uniform mixing, unpelletized carbon black is preferred.

Examples of silica used as the filler in certain embodiments of the tire rubber composition disclosed herein include, but are not limited to, precipitated amorphous silicas, dry silicas such as fumed silica, calcium silicate, and the like. Other suitable fillers include aluminum silicate, magnesium silicate, and the like.

In certain embodiments of the tire rubber composition disclosed herein, a silane coupling agent is used when silica or some other type of inorganic particles are used as the filler. In such embodiments, the silane coupling agent helps bond the filler to the conjugated diene polymer or copolymer (i.e., the elastomer), thereby improving the wear resistance of the vulcanized rubber composition. Examples of suitable silane coupling agents include, but are not limited to, functionalized polysulfide silanes such as bis(trialkoxysilylorgano) polysulfide silanes and thiocarboxylate functional silanes such as a 3-octanoylthio-1-propyltriethoxysilane. Commercial examples of the functionalized polysulfide silane coupling agents are sold under the registered trademarks SI 75 and SI 69 (both are available from Evonik Industries of Germany). A commercial example of a thiocarboxylate functional silane is sold under the registered trademark NXT (available from Momentive Performance Materials of Wilton, Conn.).

In accordance with certain embodiments, the fillers used in the rubber compositions disclosed herein include at least one of carbon black, silica, clay, metal oxides, or combinations thereof. Preferably, the rubber compositions disclosed herein include at least one of carbon black, silica, or combinations thereof. In accordance with certain embodiments, the rubber composition comprises a combined amount of 5 to 200 phr of at least one filler, preferably 30 to 100 phr, wherein a majority of the filler is carbon black, silica or a combination thereof. One skilled in the art will understand that the amount of filler that is used in the rubber compositions disclosed herein may depend on certain properties of the filler such as its specific surface area, its structure, its interaction with polymer(s), and its specific gravity. Accordingly, those skilled in the art will be able to select a suitable amount of the filler(s) based on the properties of the filler(s).

As mentioned above, the rubber compositions disclosed herein include a curative package. In accordance one or more embodiments, a curative package includes at least one vulcanizing agent and optionally any of: vulcanizing accelerators; vulcanizing activators such as zinc oxide, stearic acid, and the like; vulcanizing inhibitors; anti-scorch agents; and the like. A "vulcanizing agent" refers to the compounds used alone, or as part of a system, to cure, i.e., crosslink, the rubber composition during vulcanization. In certain embodiments, the curative package includes at least one vulcanizing agent and at least one vulcanizing accelerator. In other embodiments, the curative package includes at least one vulcanizing agent, at least one vulcanizing accelerator, and at least one vulcanizing activator. In yet other embodiments, the curative package includes at least one vulcanizing agent, at least one vulcanizing accelerator, at least one vulcanizing activator, and at least one vulcanizing inhibitor. In still other embodiments, the curative package includes at least one vulcanizing agent, at least one vulcanizing accelerator, at least one vulcanizing activator, at least one vulcanizing inhibitor, and at least one anti-scorching agent.

Examples of suitable types of vulcanizing agents used in the rubber compositions disclosed herein, include but are not limited to, sulfur or peroxide-based curing systems. Examples of specific suitable sulfur vulcanizing agents used in the rubber compositions disclosed herein include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. The sulfur vulcanizing agents are used in an amount ranging from 0.1 to 10 phr, 0.2 to 7.5 phr, and preferably from 0.2 to 5 phr.

Vulcanizing accelerators are used to control the time and/or temperature required for vulcanization and to improve properties of the vulcanizate. Examples of suitable vulcanizing accelerators used in the rubber compositions disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. The amount of the vulcanization accelerator used ranges from 0.1 to 7 phr, preferably 0.2 to 5 phr.

In certain embodiments, process oils can be used to extend and soften the rubber compositions disclosed herein. Examples of suitable process oils that may be used include, but are not limited to, paraffinic oils, aromatic oils, naphthenic oils, vegetable oils other than castor oils, and low polycyclic aromatic content ("low PCA oils"). Low PCA oils are oils that contain less than 3 wt % polycyclic aromatic content (as measured by IP346). Examples of such low PCA oils useful for the rubber compositions disclosed herein include various naphthenic oils, mild extraction solvates (MES) and treated distillate aromatic extracts (TDAE). In certain embodiments, the process oil comprises Black Oil. Up to 100 phr of process oil can be used with certain embodiments of the tire rubber composition disclosed herein; in other embodiments, between 0 and 50 phr; in yet other embodiments between 0 and 20 phr.

Other additives that can be used in the rubber compositions disclosed herein are also well known to those of skill in the art and include resins, such as tackifying resins, reinforcing resins, and the like; plasticizers; pigments; additional fillers; fatty acids such as stearic acid; zinc oxide; antioxidants such as diphenyl-p-phenylenediamine (DPPD), N-(1,3-dimethylbutyl)-N"-phenyl-1,4-benzenediamine (6PPD), and the like; anti-ozonants; peptizing agents; and one or more additional rubbers.

The rubber compositions disclosed herein are useful for different components of a pneumatic tire, including but not limited to, treads, subtreads, black sidewalls, bead fillers, and the like. In accordance with a preferred embodiment, the rubber compositions disclosed herein are used as a tire tread.

The rubber compositions disclosed herein can be prepared using standard equipment such as, e.g., Banbury or Brabender mixers. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. Typically, the rubber compositions disclosed herein are prepared using two or more mixing stages. During the first stage (also known as the "master batch" stage), ingredients including the rubber components and fillers are mixed. The mixing during this stage typically occurs at temperatures of about 100° C. to about 200° C. for a period of time or until a discharge or drop temperature, typically about 165° C., is reached. To prevent premature vulcanization (also known as scorch), this initial masterbatch may exclude any vulcanizing agents or other components of the curative package.

For certain rubber compositions such as where a formulation includes higher amounts of filler or fillers other than (or in addition to) carbon black, a separate re-mill stage may be employed for separate addition of the other fillers in order to reduce the compound viscosity and improve the dispersion of the fillers. This stage often is performed at temperatures similar to, although often slightly lower than, those employed in the master batch stage.

Most or all of the components of the curative package, e.g., vulcanizing agents, vulcanizing accelerators, vulcanizing activators, etc., are generally added at a final mixing stage. To avoid undesirable scorching and/or premature onset of vulcanization, this mixing step often is done at lower temperatures, e.g., starting at about 60° C. to about 75° C. and not going higher than about 105° C. to about 110° C. As referred to herein, the term "final batch" means the composition that is present during the final mixing stage. Typically, when the rubber compositions are to be used in tires, vulcanization is effected by heating the vulcanizable composition in a mold under pressure. Pneumatic tires can be made as disclosed in U.S. Pat. Nos. 5,866,171, 5,876,527, 5,931,211, and 5,971,046, which are incorporated herein by reference.

Depending upon the ultimate use for the rubber composition, it may be processed (e.g., milled) into sheets prior to being formed into any of a variety of components and then vulcanized, which typically occurs at about 5° C. to about 15° C. higher than the highest temperatures employed during the mixing stages, most commonly about 170° C.

In accordance with one embodiment of the tire rubber compositions disclosed herein, the rubber composition comprises (a) at least one conjugated diene polymer or copolymer containing at least one conjugated diene monomer and optionally at least one vinyl-containing monomer; (b) at least one filler in an amount of 5 to 200 phr, wherein a majority of the filler is carbon black, silica, or a combination thereof; (c) a curative package; and (d) at least one of: (i) from 0.2 to 10 phr of at least one halogenated hydrocarbon wax, or (ii) from 0.2 to 10 phr of at least one silicone-containing wax comprising a functionalized polyalkylsiloxane, a functionalized polyalkylsilsesquioxane resin, or combinations thereof. In certain embodiments, the halogenated hydrocarbon wax is a chlorinated hydrocarbon wax or a fluorinated hydrocarbon wax. In certain embodiments, the rubber composition comprises from 0.5 to 5 phr of the at least one fluorinated hydrocarbon wax. In other embodiments, the rubber composition comprises from 0.5 to 5 phr of the at least one silicone-containing wax. In yet other embodiments, the rubber compositions comprises from 0.5 to 5 phr of the at least one chlorinated hydrocarbon wax.

In certain of the preceding embodiments, the at least one fluorinated hydrocarbon wax comprises 0.2% to 70% by weight fluorine based on the total weight of the wax. In other embodiments, the at least one fluorinated hydrocarbon wax comprises 0.2 to 12% by weight fluorine based on the total weight of the wax. Moreover, in certain of the preceding embodiments, the at least one fluorinated hydrocarbon wax comprises a fluorinated paraffin wax. In addition, in accordance with certain of the preceding embodiments, the at least one fluorinated hydrocarbon wax is solid at temperatures from 20° C. to 25° C.

In certain of the preceding embodiments, the at least one chlorinated hydrocarbon wax comprises 35-75% by weight chlorine based on the total weight of the wax. Moreover, in certain of the preceding embodiments, the at least one chlorinated hydrocarbon wax comprises a chlorinated paraffin wax. In addition, in accordance with certain of the preceding embodiments, the at least one chlorinated hydrocarbon wax is solid at temperatures from 20° C. to 25° C.

As mentioned above, in certain of the preceding embodiments, the at least one silicone-containing wax comprises a functionalized polyalkylsiloxane. In accordance with certain of the preceding embodiments, the functionalized polyalkylsiloxane is a functionalized polydimethylsiloxane. In addition, in accordance with certain of the preceding embodiments, the functionalized polyalkylsiloxane is selected from the group consisting of an alkyl functional polydimethylsiloxane, an alkenyl functional polydimethylsiloxane, an alkynyl functional polydimethylsiloxane, a perfluoroalkyl functional polydimethylsiloxane, and combinations thereof. In certain of the preceding embodiments, the alkyl functional group of the alkyl functional polydimethylsiloxane has from 9 to 45 carbon atoms.

As mentioned above, in certain of the preceding embodiments, the silicone-containing wax comprises a functionalized polyalkylsilsesquioxane resin. In accordance with certain embodiments, the functionalized polyalkylsilsesquioxane resin includes at least one functional group represented by the general formula $R^3(CH_3)_2SiO_{1/2}$, where $R^3$ is an alkyl group and has from 30 to 45 carbon atoms. Further in accordance with the preceding embodiment, the functionalized polyalkylsilsesquioxane resin further includes at least one functional group represented by the general formula $R^4R^5SiO_{2/2}$, where $R^4$ is selected from the group consisting of an alkyl group having from 1 to 45 carbon atoms, an alkenyl group having from 2 to 45 carbon atoms, an alkynyl group having from 2 to 45 carbon atoms, a hydroxyl group, sulfhydryl groups, ester groups, ether groups, and acid groups; and where $R^5$ is selected from the group consisting of an alkyl group having from 1 to 45 carbon atoms, an alkenyl group having from 2 to 45 carbon atoms, an alkynyl group having from 2 to 45 carbon atoms, a hydroxyl group, sulfhydryl groups, ester groups, ether groups, and acid groups.

As mentioned above, certain embodiments of the rubber compositions disclosed herein comprise (a) at least one conjugated diene polymer or copolymer; (b) at least one filler; (c) a curative package; (d) at least one of: (i) from 0.2 to 10 phr of at least one halogenated hydrocarbon wax, or (ii) from 0.2 to 10 phr of at least one silicone-containing wax comprising a functionalized polyalkylsiloxane, a functionalized polyalkylsilsesquioxane resin, or combinations thereof. In certain embodiments, the halogenated hydrocarbon wax is a chlorinated hydrocarbon wax or a fluorinated hydrocarbon wax. In certain embodiments, the rubber composition further comprises a conventional wax selected from the group consisting of a microcrystalline wax, a paraffin wax, and combinations thereof.

As also mentioned above, the rubber compositions disclosed herein include at least one conjugated diene polymer or copolymer. In accordance with certain embodiments of the rubber compositions disclosed herein, the at least one conjugated diene polymer or copolymer is derived from monomer units selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, styrene, α-methylstyrene, p-methylstyrene, o-methylstyrene, p-butylstyrene, vinylnaphthalene, and combinations thereof.

As mentioned above, the rubber compositions disclosed herein include at least one filler. In accordance with certain embodiments of the rubber compositions disclosed herein, the at least one filler is selected from the group consisting of carbon black, silica, clay, metal oxides, and combinations thereof.

Moreover, in certain of the preceding embodiments, the at least one conjugated diene polymer or copolymer is present in an amount of 100 phr and is selected from the group consisting of polybutadiene, a styrene-butadiene copolymer, polyisoprene, natural rubber, and combinations thereof; and the at least one filler is present in an amount of from 5 to 100 phr and is selected from the group consisting of carbon black, silica, clay, metal oxides, and combinations thereof.

Rubber compositions according to the embodiments disclosed herein exhibit an adjusted surface hydrophobicity or hydrophilicity as measured by a contact angle with water different from that of a rubber formed from a comparative composition. The comparative composition refers to one with the same rubber composition except containing a conventional wax instead of either (i) from 0.2 to 10 phr of at least one halogenated hydrocarbon wax, or (ii) from 0.2 to 10 phr of at least one silicone-containing wax, and the conventional wax is present in the same amount as either (i), or (ii).

In another embodiment, the present disclosure provides a tire containing a tread comprising the rubber compositions disclosed herein.

EXAMPLES

The following examples are for purposes of illustration only and are not intended to limit the scope of the claims which are appended hereto.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

Examples 1-6

Six rubber compositions were prepared within a Brabender internal mixer (65 gram capacity) according to the formulations shown Table 1, using varying agitation speeds as shown in Table 1A below. As detailed in Tables 1 and 1A, a two stage mixing procedure was employed. (Unless indicated otherwise, all amounts of ingredients in the Tables are listed in terms of phr, parts per hundred parts rubber.)

TABLE 1

| | Formulation (phr) | Ex. 1 | Ex. 2 | Ex. 3 | Ex. 4 | Ex. 5 | Ex. 6 |
|---|---|---|---|---|---|---|---|
| Master Batch | Styrene butadiene[a] | 100 | 100 | 100 | 100 | 100 | 100 |
| | Carbon black[b] | 50 | 50 | 50 | 50 | 50 | 50 |
| | Black oil | 10 | 10 | 10 | 10 | 10 | 10 |
| | Stearic acid | 2.0 | 2.0 | 2.0 | 2.0 | 2.0 | 2.0 |
| | 6PPD[c] | 0.95 | 0.95 | 0.95 | 0.95 | 0.95 | 0.95 |
| | Conventional wax[d] | 2.0 | 0 | 0 | 0 | 0 | 0 |
| | Hydrocarbon wax[e] | 0 | 2.0 | 0 | 0 | 0 | 0 |
| | Lightly fluorinated wax[f] | 0 | 0 | 2.0 | 0 | 0 | 0 |
| | Highly fluorinated wax 1[g] | 0 | 0 | 0 | 2.0 | 0 | 0 |
| | Highly fluorinated wax 2[h] | 0 | 0 | 0 | 0 | 2.0 | 0 |
| | Silicone wax[i] | 0 | 0 | 0 | 0 | 0 | 2.0 |
| Final Batch | Zinc oxide | 2.5 | 2.5 | 2.5 | 2.5 | 2.5 | 2.5 |
| | DPG[j] | 0.3 | 0.3 | 0.3 | 0.3 | 0.3 | 0.3 |
| | MBTS[k] | 0.5 | 0.5 | 0.5 | 0.5 | 0.5 | 0.5 |
| | TBBS[l] | 0.5 | 0.5 | 0.5 | 0.5 | 0.5 | 0.5 |
| | Sulfur | 1.5 | 1.5 | 1.5 | 1.5 | 1.5 | 1.5 |

[a] DURADENE 706 available from Firestone Polymers of Akron, OH.
[b] N343 carbon black.
[c] Antioxidant 6PPD.
[d] Microcrystalline wax blend: 20% microcrystalline and 80% paraffin; melting point ~170° F. (available from Crystal, Inc., United States)
[e] 100 wt % Paraffin ski wax (SWIX CH8 wax available from Swix Sport AS of Norway).
[f] Fluorinated hydrocarbon ski wax having 0.616 wt % fluorine based on the total weight of the wax (SWIX LF8 wax available from Swix Sport AS).
[g] Fluorinated hydrocarbon ski wax having 4.69 wt % fluorine based on the total weight of the wax (SWIX HF8 wax available from Swix Sport AS).
[h] Fluroinated hydrocarbon ski wax having 5.82 wt % fluorine based on the total weight of the wax (SWIX HF8BW wax available from Swix Sport AS).
[i] Polydimethylsiloxane having aliphatic groups (WACKER W23 Silicone Wax available from Wacker Chemie AG of Germany)
[j] Diphenyl guanidine.
[k] 2,2'-Dithiobis(benzothiazole).
[l] N-tert-butyl-2-benzothiazole-sulfenamide.

TABLE 1A

| Stage | Time | Condition |
|---|---|---|
| Master Batch Stage (initial temp: 130-135° C., rotor rpm started at 60 and increased to 90 at 4.5 min) | 0 min | Charge polymers |
| | 0.5 min | Charge oil, filler and other master batch ingredients |
| | 5.5 min | Drop based on time or max temperature of 165° C. |
| Final Batch Stage (initial temp: 60-65° C., rotor rpm at 40) | 0 sec | Charge master batch |
| | 30 seconds | Charge curatives |
| | 150 seconds | Drop on mixing time or max temperature of 110° C. |

As shown in Table 1, Examples 1 and 2 were prepared as controls using hydrocarbon-only waxes instead of the fluorinated hydrocarbon or silicone-containing waxes used in Examples 3-6.

The bound rubber percentage for each Examples 1-6 was determined by solvent extraction with toluene at room temperature. More specifically, multiple small specimens of each uncured rubber sample (total weight about 0.2 g) were placed into a cylinder with 40 mesh stainless steel screen at the bottom and immersed in toluene for three days. The solvent was removed and the remaining specimens on the screen were dried and weighed. The percentage of bound rubber was then determined according to the formula percent (by weight) bound rubber=$(100(W_d-F))/R$ where $W_d$ is the weight of the remains of the dried specimens, F is the weight of the filler and any other solvent insoluble matter in the original sample, and R is the weight of the rubber in the original sample. The bound rubber percentages measured for Examples 1-6 are shown in Table 2 below.

Following the final batch stage, the rubber compositions were sheeted into specimens of different shapes for each of Examples 1-6, which in turn were respectively used in the different tests described in paragraphs 66-69 below. The specimens were then cured at 165° C. for a proper duration as determined by a cure test for the composition from each Example, thereby forming respective differently shaped vulcanizate specimens for each of Examples 1-6. The vulcanizate specimens for Examples 1-6 were subject to various tests, and the results of those tests are provided in Table 2 below.

The dynamic viscoelastic properties of the vulcanizate specimens were measured by three different tests. The first dynamic viscoelastic test was a temperature sweep test performed using an ARES (Advanced Rheometric Expansion System) from TA Instruments. The test specimen had a rectangular geometry having a thickness of 2 mm, and a width of 12.7 mm. The length of specimen between the grips on the test machine, i.e., the gap, was approximately 28 mm. The test was conducted using a frequency of 10 Hz. The temperature was started at −70° C. and increased to 120° C. The strain was 0.20% for the temperature range of −70° C. to −6° C., and 2.0% for the temperature range of −5° C. to 120° C.

The second dynamic viscoelastic test was a dynamic strain sweep test performed using an ARES from TA Instruments. The test was carried out in a parallel plate geometry with a rubber button test specimen having a diameter of 7.8 mm and a height of 6 mm. The test was conducted using a frequency of 15 Hz. The temperature was held constant at the desired temperature, which was 50° C. The strain was swept from 0.1% to 24.6%, logarithmically.

The third viscoelastic test was a dynamic compression test performed using a DYNASTAT mechanical spectrometer from Dynastatics Instruments Corp. The test was carried out using a cylindrical test specimen having a 9.3 mm diameter and a 15 mm height. The sample was compressed under a static load of 2 kg before testing. After it reached an equilibrium state, the test started with a dynamic load having an amplitude of 1.25 kg at a frequency of 10 Hz and at a temperature of 60° C. The sample was thus cyclically deformed. The resulting hysteresis (tangent δ) measurements from this test are shown in Table 2 below.

Tensile mechanical properties of the vulcanizate samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in Table 2 below as engineering-stresses by reference to the original cross-sectional area of the test piece. The specimens were tested at 23° C.

A Ramé-Hart Model 500 Advanced Goniometer was used to measure the contact angle of deionized water located on the surface of the vulcanizate samples. The measured contact angle is indicative of the relative hydrophobicity and hydrophilicity of the vulcanizate sample surface. In general, a surface where the measured contact angle of deionized water is greater than 90° is a relatively hydrophobic surface. A surface where the measured contact angle of deionized water is less than 90° is relatively hydrophilic. Accordingly, as the contact angle increases for water, the surface becomes relatively more hydrophobic.

For the contact angle measurement, a specimen was cut from a flat vulcanizate sheet of each Example. Each specimen was 1.9 mm thick for this measurement. The measurements were made by placing a 3.6-4.0 μL drop of deionized water either (A) on the surface 72 hours after the surface was first wiped with acetone and then dried in a vacuum oven heated to

TABLE 2

|  | Ex. 1 | Ex. 2 | Ex. 3 | Ex. 4 | Ex. 5 | Ex. 6 |
|---|---|---|---|---|---|---|
| bound rubber % (weight) | 24.4 | 25.2 | 24.6 | 24.8 | 24.4 | 24.0 |
| Temp. Sweep at 10 Hz | | | | | | |
| peak tan δ | 0.743 | 0.729 | 0.736 | 0.738 | 0.745 | 0.767 |
| T at peak tan δ (° C.) | −46.1 | −46.1 | −46.0 | −46.1 | −45.9 | −46.1 |
| Strain Sweep at 50° C. & 15 Hz | | | | | | |
| G' at 9.8% (MPa) | 2.44 | 2.48 | 2.51 | 2.49 | 2.64 | 2.62 |
| tan δ at 9.8% | 0.195 | 0.197 | 0.192 | 0.197 | 0.190 | 0.194 |
| Dynastat at 60° C. & 10 Hz | | | | | | |
| tan δ | 0.176 | 0.179 | 0.174 | 0.179 | 0.175 | 0.174 |
| Tensile at RT | | | | | | |
| Mod50% (MPa) | 1.78 | 1.75 | 1.75 | 1.74 | 1.79 | 1.87 |
| Mod300% (MPa) | 14.96 | 13.89 | 14.91 | 14.14 | 14.95 | 15.66 |
| Tb$^a$ (MPa) | 21.9 | 20.4 | 20.2 | 21.1 | 19.4 | 22.7 |
| Eb$^b$ % | 421.0 | 428.6 | 393.0 | 429.0 | 378.9 | 420.1 |

$^a$Tension at break
$^b$Elongation at break

As shown in Table 2, the use of the fluorinated hydrocarbon waxes (Examples 3-5) and the silicone-containing wax (Example 6) does not significantly impact the bound rubber percent or the bulk mechanical properties, i.e., dynamic viscoelastic properties and tensile mechanical properties, as compared to the control Examples 1 and 2 (using the hydrocarbon waxes). However, Table 3 below, shows that the respective use of the fluorinated hydrocarbon waxes and the silicone-containing wax in Examples 3-6 does affect the relative hydrophobicity or hydrophilicity of vulcanizate samples.

45° C. for 10 minutes, or (B) directly on the surface without any cleaning. From three to eight drops were measured at different locations on each specimen's surface. The results of these measurements are provided in Table 3 below. The values in Table 3 are listed as the average measurement±the standard deviation.

TABLE 3

|  |  | Ex. 1 | Ex. 2 | Ex. 3 | Ex. 4 | Ex. 5 | Ex. 6 |
|---|---|---|---|---|---|---|---|
| Contact angle (°) | Clean Surface (A) | 100.4 ± 1.0 | 104.2 ± 0.8 | 102.6 ± 2.0 | 119.4 ± 4.6 | 121.5 ± 1.1 | 105.9 ± 1.9 |
| | Surface without Cleaning (B) | 104.0 ± 0.8 | 109.6 ± 1.5 | 109.7 ± 2.9 | 126.1 ± 8.7 | 130.6 ± 5.9 | 97.2 ± 4.5 |

The results provided in Table 3 show that the use of fluorinated hydrocarbon waxes (Examples 3-5) or a silicone-containing wax (Example 6) adjusts the relative hydrophobicity or hydrophilicity of the vulcanizate as compared to the control vulcanizates of Examples 1 and 2 prepared using a hydrocarbon-only wax. Table 3 also shows that the relative hydrophobicity of the samples prepared with the fluorinated hydrocarbon waxes increases as the percent of the fluorine in the wax, as measured by weight, increases. Specifically, the contact angle increases between Examples 3 and 4 as well as between Examples 4 and 5. Each of Examples 3, 4, and 5 are prepared using fluorinated hydrocarbon waxes having different fluorine contents. As shown in Table 1 above, these Examples 3-5 are prepared using the same amount of wax (2 phr). However, the wax used in Example 3 is a fluorinated hydrocarbon ski wax having 0.616 wt % fluorine based on the total weight of the wax (SWIX LF8). The wax used in Example 4 is a fluorinated hydrocarbon ski wax having 4.69 wt % fluorine based on the total weight of the wax (SWIX HF8). The wax used in Example 5 is a fluorinated hydrocarbon ski wax having 5.82 wt % fluorine based on the total weight of the wax (SWIX HF8BW). Thus, as the content of the fluorine increases in each fluorinated hydrocarbon wax (as measured by weight percent), the relative hydrophobicity also increases as measured by the contact angle of water in these Examples.

All of the Examples containing fluorinated hydrocarbon wax (i.e., Examples 3-5) had an increase in hydrophobicity as compared to control Example 1 (containing conventional paraffin wax). Examples 4 and 5 (containing relatively higher amounts of fluorine) also showed an increase in hydrophobicity as compared to control Example 2 (containing conventional hydrocarbon wax). Interestingly, the Example containing the silicone wax (Example 6), became less hydrophobic without first cleaning the surface as compared to both control Examples and the clean surface version of this Example.

Examples 7-15

Nine additional rubber compositions were prepared according to the formulations shown in Table 4 in a manner similar to those prepared above using varying agitation speeds as shown in Table 4A below, except that a 300-gram capacity mixer was utilized and a three-stage mixing procedure (employing a remill as a second step in the master batch stage) instead of a two-stage mixing procedure was used. The three stage mixing procedure employed is detailed in Table 4A below.

TABLE 4

|  | Formulation (phr) | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Master batch | Styrene butadiene$^a$ | 100 | 100 | 100 | 100 | 100 | 100 | 100 | 100 | 100 |
|  | Silica$^b$ | 52.5 | 52.5 | 52.5 | 52.5 | 52.5 | 52.5 | 52.5 | 52.5 | 52.5 |
|  | Black oil | 10 | 10 | 10 | 10 | 10 | 10 | 10 | 10 | 10 |
|  | Stearic acid | 2 | 2 | 2 | 2 | 2 | 2 | 2 | 2 | 2 |
|  | 6PPD$^c$ | 1 | 1 | 1 | 1 | 1 | 1 | 1 | 1 | 1 |
|  | Conventional wax$^d$ | 2 | 0 | 0 | 0 | 0 | 0 | 0 | 0 | 0 |
|  | Silicone wax 1$^e$ | 0 | 2 | 5 | 0 | 0 | 0 | 0 | 0 | 0 |
|  | Silicone wax 2$^f$ | 0 | 0 | 0 | 2 | 5 | 0 | 0 | 0 | 0 |
|  | Fluorinated silicone wax 1$^g$ | 0 | 0 | 0 | 0 | 0 | 2 | 5 | 0 | 0 |
|  | Fluorinated silicone wax 2$^h$ | 0 | 0 | 0 | 0 | 0 | 0 | 0 | 2 | 5 |
| Remill | Silica$^b$ | 2.5 | 2.5 | 2.5 | 2.5 | 2.5 | 2.5 | 2.5 | 2.5 | 2.5 |
|  | Silane$^i$ | 5 | 5 | 5 | 5 | 5 | 5 | 5 | 5 | 5 |
| Final batch | Zinc oxide | 2.5 | 2.5 | 2.5 | 2.5 | 2.5 | 2.5 | 2.5 | 2.5 | 2.5 |
|  | DPG$^j$ | 1.4 | 1.4 | 1.4 | 1.4 | 1.4 | 1.4 | 1.4 | 1.4 | 1.4 |
|  | MBTS$^k$ | 2 | 2 | 2 | 2 | 2 | 2 | 2 | 2 | 2 |
|  | TBBS$^m$ | 0.7 | 0.7 | 0.7 | 0.7 | 0.7 | 0.7 | 0.7 | 0.7 | 0.7 |
|  | Sulfur | 1.5 | 1.5 | 1.5 | 1.5 | 1.5 | 1.5 | 1.5 | 1.5 | 1.5 |

$^a$DURADENE 706 (available from Firestone Polymers of Akron, Ohio).
$^b$HI-SIL 190 available from PPG of Pittsburgh, Pennsylvania.
$^c$Antioxidant 6PPD.
$^d$Microcrystalline wax blend: 20% microcrystalline and 80% paraffin; melting point ~170° F. (available from Crystal, Inc., United States).
$^e$Behenyl polydimethylsiloxane (PECOSIL AS-22).
$^f$Cerotyl polydimethylsiloxane (PECOSIL AS-26).
$^g$Perfluorononylethyl carboxydecyl behenyl polydimethylsiloxane (PECOSIL FST-422).
$^h$Perfluorononylethyl carboxydecyl lauryl/behenyl polydimethylsiloxane (PECOSIL FST-41222).
$^i$Sulfur-containing organosilane (SI 75).
$^j$Diphenyl guanidine.
$^k$2,2'-Dithiobis(benzothiazole).
$^l$N-tert-butyl-2-benzothiazole-sulfenamide.

TABLE 4A

| Stage | Time | Condition |
|---|---|---|
| Master Batch Stage (initial temp: 90-95° C., rotor rpm started at 50 and increased to 90 at 4.5 min) | 0 min | Charge polymers |
|  | 0.5 min | Charge oil, filler and other master batch ingredients |
|  | 5.5 min | Drop based on time or max temperature of 165° C. |
| Remill Stage (initial temp: 100-105° C., rotor rpm at 50) | 0 min | Charge master batch |
|  | 0.5 min | Charge silica and silane |
|  | 3.5 min | Drop based on time or max temperature of 150° C. |
| Final Batch Stage (initial temp: 60-65° C., rotor rpm at 40) | 0 sec | Charge master batch |
|  | 30 seconds | Charge curatives |
|  | 150 seconds | Drop on mixing time or max temperature of 110° C. |

As shown in Table 4, Example 7 was prepared as a control using a hydrocarbon-only conventional paraffin wax against which the silicone-containing waxes used in Examples 8-15 can be compared. Following the final batch stage, the rubber compositions were sheeted into specimens of different shapes, which in turn were respectively used in the different tests described in paragraphs 77-78 below. The specimens were then cured at 171° C. for a proper duration as determined by a cure test for the composition from each Example, thereby forming respective differently shaped vulcanizate specimens for each of Examples 7-15.

The vulcanizate samples for Examples 7-15 were subjected to contact angle tests and wet-skid tests, and the results of those tests are provided in Table 5 below. The contact angle tests for Examples 7-15 were performed in the same manner as described above on the vulcanizate surfaces of the Examples that were not cleaned prior to testing [i.e., in the same manner as (B) above for Examples 1-6] using 6 droplets of deionized water about 2 μL in size for each Example. The contact angle values in Table 5 are listed as the average measurement±the standard deviation.

The skid resistance of vulcanized rubber sliders formed from the compositions of Examples 7-15 were tested with a portable British pendulum skid tester (available from Munro Stanley London) on a wet (water) Portland concrete surface. The results are shown in Table 5 and are expressed as the British Pendulum Number (BPN). A higher BPN indicates a higher wet skid resistance. The rubber sliders in this test were not cleaned with organic solvent prior to the wet skid testing.

TABLE 5

|  | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Contact angle (°) | 112.3 ± 2.3 | 105.6 ± 1.6 | 109.2 ± 1.8 | 105.3 ± 1.5 | 102.8 ± 2.9 | 114.2 ± 2.9 | 119.1 ± 6.6 | 119.0 ± 4.4 | 118.9 ± 3.5 |
| BPN | 38 | 44.1 | 45.1 | 45.1 | 45.9 | 45.7 | 45.9 | 46 | 45.4 |

Table 5 shows that using a silicone-containing wax adjusts the relative hydrophobicity or hydrophilicity of the vulcanizate as compared to the control vulcanizate of Example 7, which uses a hydrocarbon-only wax. Table 5 also shows that the vulcanizates prepared using a silicone-containing wax, i.e., Examples 8-15, each exhibit better wet skid resistance (as measured by BPN) compared to the control vulcanizate of Example 7 prepared using the hydrocarbon-only wax.

Examples 16-20

Carbon-black containing rubber compositions were prepared according to the formulations provided in Table 6 utilizing either a chlorinated hydrocarbon wax, a conventional wax or a combination of the chlorinated hydrocarbon wax and the conventional wax. The compositions were prepared in a manner similar to Examples 1-6, using a Brabender mixer (300 gram capacity) and a two-stage mixing procedure as disclosed in Table 1A

TABLE 6

| | Formulation (phr) | Ex. 16 | Ex. 17 | Ex. 18 | Ex. 19 | Ex. 20 |
|---|---|---|---|---|---|---|
| Master Batch | Styrene-butadiene[a] | 100 | 100 | 100 | 100 | 100 |
| | N339 Carbon black | 50 | 50 | 50 | 50 | 50 |
| | Black oil | 10 | 10 | 10 | 10 | 10 |
| | Stearic acid | 2 | 2 | 2 | 2 | 2 |
| | 6PPD[b] | 0.95 | 0.95 | 0.95 | 0.95 | 0.95 |
| | Conventional wax[c] | 2 | 0 | 2 | 0 | 2 |

TABLE 6-continued

| | Formulation (phr) | Ex. 16 | Ex. 17 | Ex. 18 | Ex. 19 | Ex. 20 |
|---|---|---|---|---|---|---|
| | Chlorinated wax[d] | 0 | 2 | 2 | 4 | 4 |
| Final Batch | Zinc oxide | 2.5 | 2.5 | 2.5 | 2.5 | 2.5 |
| | DPG[e] | 0.3 | 0.3 | 0.3 | 0.3 | 0.3 |
| | MBTS[f] | 0.5 | 0.5 | 0.5 | 0.5 | 0.5 |
| | TBBS[g] | 0.5 | 0.5 | 0.5 | 0.5 | 0.5 |
| | Sulfur | 1.5 | 1.5 | 1.5 | 1.5 | 1.5 |
| | Total | 170.25 | 170.25 | 172.25 | 172.25 | 174.25 |

[a]DURADENE 706 available from Firestone Polymers of Akron, OH.
[b]Antioxidant 6PPD.
[c]Microcrystalline wax blend: 20% microcrystalline and 80% paraffin; melting point ~170° F. (available from Crystal, Inc., United States).
[d]Chlorez 700 chlorinated wax (available from Dover Chemical Corporation, Dover, Ohio).
[e]Diphenyl guanidine
[f]2,2'-Dithiobis(benzothiazole).
[g]N-tert-butyl-2-benzothiazole-sulfenamide.

Following the final batch stage, the rubber compositions for Examples 16-20 were sheeted into specimens of different shapes, which in turn were respectively used in the different tests described above for Examples 1-6. The specimens were then cured at 171° C. for a proper duration as determined by a cure test for the composition from each Example, thereby forming respective differently shaped vulcanizate specimens for each of Examples 16-20.

The vulcanizate samples for Examples 16-20 were subjected to contact angle tests and wet-skid tests, and the results of those tests are provided in Table 7 below. The contact angle tests for Examples 16-20 were performed using a Ramé-Hart Model 500 advanced Goniometer, with deionized water under ambient conditions. When a dry thin film of Chlorez 700 was deposited on the surface of a glass slide in air (by first dissolving 3.0 grams of Chlorex 700 in 30 grams of toluene), the water contact angle on Chlorez 700 was about 86° (average from 6 readings with standard deviation of 0.6°), indicating slight hydrophilicity. The water contact angle for the rubber compositions was obtained on freshly-cut compound surface with a clean blade. The contact angle values in Table 7 are listed as the average measurement, while the row headed "std. deviation" provides their standard deviations.

The skid resistance of vulcanized rubber sliders formed from the compositions of Examples 16-20 were tested with a portable British pendulum skid tester (available from Munro Stanley London) on a wet (water) Portland concrete surface. Two specimens were tested for each rubber composition. The results are shown in Table 7 and are expressed as the British Pendulum Number (BPN). For one specimen, prior to the testing, the edge of the rubber slider to be tested was wiped with a tissue soaked with isopropanol for removal of surface contaminants. No edge cleaning was applied to the other specimen. When a slider was installed onto the pendulum skid tester, at least 12 consecutive tests were carried out. The BPN numbers provided in Table 7 represent the average BPN from the 9th to the 12th reads. A higher BPN indicates a better wet skid resistance.

TABLE 7

| Property | Ex. 16 | Ex. 17 | Ex. 18 | Ex. 19 | Ex. 20 |
|---|---|---|---|---|---|
| BPN (edge wiped) | 45.4 | 46.3 | 45.6 | 45.6 | 46 |
| BPN (edge not wiped) | 38.4 | 44.2 | 39.6 | 44.2 | 39.2 |
| Contact angle (°) with water | 110.6 | 101.4 | 109.0 | 103.0 | 110.7 |
| Std. deviation | 3.8 | 4.3 | 3.1 | 1.2 | 0.9 |
| Viscosity (ML1 + 4) at 130° C. | 43.9 | 45.9 | 42.6 | 44.6 | 41 |
| Temp. Sweep at 10 Hz | | | | | |
| peak tan δ (−15° C., 2%) | 0.279 | 0.285 | 0.265 | 0.278 | 0.296 |
| Strain Sweep at 50° C. & 15 Hz | | | | | |
| G' at 9.9% (MPa) | 2.3 | 2.39 | 2.26 | 2.44 | 2.32 |
| tan δ at 9.9% | 0.195 | 0.19 | 0.194 | 0.193 | 0.19 |
| Tensile at RT | | | | | |
| Mod50% (MPa) | 1.61 | 1.63 | 1.72 | 1.74 | 1.70 |
| Mod300% (MPa) | 13.70 | 13.79 | 14.66 | 15.40 | 14.12 |
| Tb$^a$ (MPa) | 21.2 | 22.2 | 21.8 | 21.1 | 23 |
| Eb$^b$ % | 435.9 | 448.4 | 425.4 | 390.7 | 460.7 |

$^a$Tension at break
$^b$Elongation at break

Examples 21-25

Silica containing rubber compositions were prepared according to the formulations provided in Table 8 utilizing either a chlorinated wax, a conventional wax or a combination of the chlorinated wax and the conventional wax. The compositions were prepared in a manner similar to Examples 16-20 except that a three-stage mixing procedure (employing a remill as a second step in the master batch stage) instead of a two-stage mixing procedure was used. The three stage mixing procedure employed is detailed in Table 4A above.

TABLE 8

| | Formulation (phr) | Ex. 21 | Ex. 22 | Ex. 23 | Ex. 24 | Ex. 25 |
|---|---|---|---|---|---|---|
| Master Batch | Styrene-butadiene$^a$ | 100 | 100 | 100 | 100 | 100 |
| | Silica$^b$ | 50 | 50 | 50 | 50 | 50 |
| | Black oil | 10 | 10 | 10 | 10 | 10 |
| | Stearic acid | 2 | 2 | 2 | 2 | 2 |
| | 6PPD$^c$ | 0.95 | 0.95 | 0.95 | 0.95 | 0.95 |
| | Conventional wax$^d$ | 2 | 0 | 2 | 0 | 2 |
| | Chlorinated wax$^e$ | 0 | 2 | 2 | 4 | 4 |
| Remill | Silane Si 75$^f$ | 5 | 5 | 5 | 5 | 5 |
| Final Batch | Zinc oxide | 2.5 | 2.5 | 2.5 | 2.5 | 2.5 |
| | DPG$^g$ | 1.4 | 1.4 | 1.4 | 1.4 | 1.4 |
| | MBTS$^h$ | 2 | 2 | 2 | 2 | 2 |
| | TBBS$^i$ | 0.7 | 0.7 | 0.7 | 0.7 | 0.7 |
| | Sulfur | 1.5 | 1.5 | 1.5 | 1.5 | 1.5 |
| | Total | 178.05 | 178.05 | 178.05 | 178.05 | 178.05 |

$^a$DURADENE 706 available from Firestone Polymers of Akron, OH, a solution SBR having a bound styrene content of 23.5%, vinyl bond content in the butadiene portion of 14%, Tg of −62° C., viscosity of 55).
$^b$Hi-Sil 190G (PPG Industries).
$^c$Antioxidant 6PPD.
$^d$Microcrystalline wax blend: 20% microcrystalline and 80% paraffin; melting point ~170° F. (available from Crystal, Inc., United States).
$^e$Chlorez 700 chlorinated wax (available from Dover Chemical Corporation, Dover, Ohio).
$^f$Sulfur-containing organosilane (SI 75)
$^g$Diphenyl guanidine
$^h$2,2'-Dithiobis(benzothiazole).
$^i$N-tert-butyl-2-benzothiazole-sulfenamide.

Following the final batch stage, the rubber compositions for Examples 16-20 were sheeted into specimens of different shapes, which in turn were respectively used in the different tests described in the following paragraphs. The specimens were then cured at 171° C. for a proper duration as determined by a cure test for the composition from each Example, thereby forming respective differently shaped vulcanizate specimens for each of Examples 21-25.

The vulcanizate samples for Examples 21-25 were subjected to contact angle tests and wet-skid tests, and the results of those tests are provided in Table 9 below. The contact angle tests for Examples 21-25 were performed using a Ramé-Hart Model 500 advanced Goniometer, with deionized water under ambient conditions. When a dry thin film of Chlorez 700 was deposited on the surface of a glass slide in air (by first dissolving 3.0 grams of Chlorex 700 in 30 grams of toluene), the water contact angle on Chlorez 700 was about 86° (average from 6 readings with standard deviation of 0.6°), indicating slight hydrophilicity. The water contact angle for the rubber compositions was obtained on freshly-cut compound surface with a clean blade. The contact angle values in Table 9 are listed as the average measurement, while the row headed "std. deviation" provides their standard deviations.

The skid resistance of vulcanized rubber sliders formed from the compositions of Examples 21-25 were tested with a portable British pendulum skid tester (available from Munro Stanley London) on a wet (water) Portland concrete surface. Two specimens were tested for each rubber composition. The results are shown in Table 9 and are expressed as the British Pendulum Number (BPN). For one specimen, prior to the testing, the edge of the rubber slider to be tested was wiped with a tissue soaked with isopropoal for removal of surface contaminants. No edge cleaning was applied to the other specimen. When a slider was installed onto the pendulum skid tester, at least 12 consecutive tests were carried out. The BPN numbers provided in Table 9 represent the average BPN from the 9th to the 12th reads. A higher BPN indicates a higher wet skid resistance.

TABLE 9

| Property | Ex. 21 | Ex. 22 | Ex. 23 | Ex. 24 | Ex. 25 |
|---|---|---|---|---|---|
| BPN (edge wiped) | 47 | 50 | 48.9 | 52.8 | 49.6 |
| BPN (edge not wiped) | 41.2 | 50.6 | 40.4 | 51.4 | 41.2 |
| Contact angle (°) with water | 108.9 | 93.2 | 105.9 | 95.5 | 107.1 |
| Std. deviation | 2.5 | 5.0 | 2.8 | 5.8 | 4.2 |
| Viscosity (ML1 + 4) at 130° C. | 50.9 | 52.7 | 50 | 52 | 47.5 |
| Temp. Sweep at 10 Hz | | | | | |
| peak tan δ (−15° C., 2%) | 0.248 | 0.234 | 0.253 | 0.244 | 0.264 |
| Strain Sweep at 50° C. & 15 Hz | | | | | |
| G' at 9.9% (MPa) | 2.87 | 2.94 | 2.69 | 3.01 | 2.8 |
| tan δ at 9.9% | 0.191 | 0.198 | 0.193 | 0.2 | 0.195 |
| Tensile at RT | | | | | |
| Mod50% (MPa) | 2.173 | 2.126 | 2.083 | 2.178 | 2.137 |
| Mod300% (MPa) | 16.26 | 15.83 | 15.04 | 16.08 | 15.22 |
| Tb$^a$ (MPa) | 17.7 | 18.9 | 16.4 | 19.9 | 19 |
| Eb$^b$ % | 324.4 | 346.2 | 320.7 | 355.2 | 358.7 |

$^a$Tension at break
$^b$Elongation at break

Overall for Examples 16-20 and 21-25, it was observed that for silica-filled compounds, the compounds containing the chlorinated wax in the absence of conventional wax (i.e., Examples 22 and 24) exhibited improved wet skid resistance (i.e., a higher BPN number) as compared to the compound containing the conventional wax regardless of whether or not the slider edge was first cleaned with isopropanol. A similar advantage was not obtained in compounds containing carbon black (i.e., Examples 16-20) when the slider edge was first cleaned with isopropanol. In addition, the compounds containing the chlorinated wax in the absence of conventional wax (i.e., Examples 17, 19, 22 and 24) displayed a lower water contact angle in comparison to the compounds containing conventional wax. The bulk physical properties of the compounds of Examples 16-25 as well as the overall compound processability of the compounds was not particularly affected by the use of the chlorinated wax; in other words, the chlorinated wax did not cause any adverse effect on the bulk properties of the compounds.

Examples 26-29 (Effect of Chlorinated Wax on Ozone Degradation)

Carbon-black containing rubber compositions were prepared according to the formulations provided in Table 10 utilizing either a chlorinated wax or a conventional wax. The compositions were prepared in a manner similar to Examples 1-6, using a two-stage mixing procedure as disclosed in Table 1A.

TABLE 10

| | Ingredient (phr) | Ex. 26 | Ex. 27 | Ex. 28 | Ex. 29 |
|---|---|---|---|---|---|
| Master Batch | Styrene butadiene$^a$ | 100 | 100 | 0 | 0 |
| | Styrene butadiene$^b$ | 0 | 0 | 100 | 100 |
| | N339 carbon black | 50 | 50 | 50 | 50 |
| | conventional wax$^c$ | 2 | 0 | 2 | 0 |
| | chlorinated wax$^d$ | 0 | 3.5 | 0 | 3.5 |
| | Stearic acid | 2 | 2 | 2 | 2 |
| | Antioxidant$^e$ | 1 | 1 | 1 | 1 |
| Final Batch | Zinc oxide | 2.5 | 2.5 | 2.5 | 2.5 |
| | DPG$^f$ | 0.3 | 0.3 | 0.3 | 0.3 |
| | MBTS$^g$ | 0.5 | 0.5 | 0.5 | 0.5 |
| | TBBS$^h$ | 0.5 | 0.5 | 0.5 | 0.5 |
| | Sulfur | 1.5 | 1.5 | 1.5 | 1.5 |

$^a$DURADENE 706 available from Firestone Polymers of Akron, OH, a solution SBR having a bound Styrene content of 23.5%, vinyl bond content in the butadiene portion of 14%, Tg of −62° C., viscosity of 55.
$^b$DURADENE 739 available from Firestone Polymers of Akron, OH, a tin-coupled solution SBR having a bound styrene content 20.0, vinyl bond content in the butadiene portion of 60%, Tg of −34° C., viscosity of 92.
$^c$Macrocrystalline wax blend: 20% microcrystalline and 80% paraffin; melting point ~170° F. (available from Crystal, Inc., United States).
$^d$Chlorez 700 chlorinated wax (available from Dover Chemical Corporation, Dover, Ohio).
$^e$Antioxidant 6PPD.
$^f$Diphenyl guanidine.
$^g$2,2'-Dithiobis(benzothiazole).
$^h$N-tert-butyl-2-benzothiazole-sulfenamide.

Following the final batch stage, the rubber compositions for Examples 26-29 were sheeted into specimens of different shapes, which in turn were respectively used in the different tests described above for Examples 1-6. The specimens were then cured at 171° C. for a proper duration as determined by a cure test for the composition from each Example, thereby forming respective differently shaped vulcanizate specimens for each of Examples 26-29.

For each of the rubber compositions according to Examples 26-29, an approximately 2 gram sample of each composition was taken and tested for ozone degradation according to the following procedure. Each rubber sample was individually soaked in 200 mL of room temperature chloroform for 12 hours; thereafter, the rubber sample was removed from the chloroform and vacuum dried in an oven at 60° C. for at least 12 hours. After vacuum drying, the sample was again weighed, and thereafter soaked again in 200 mL of room temperature chloroform for 12 hours. During the second chloroform soaking, each sample was subjected to ozone treatment for 10 minutes (ozone gas was bubbled through the chloroform). Ozone concentration in the air stream was approximately 5%. After the ozone treatment in the chloroform was completed, samples were removed from chloroform and dried in a vacuum oven for at least 12 hours at a temperature of 60° C., then removed from the oven and allowed to equilibrate at ambient conditions for 2 hours and weighed. Weight loss results are reported in Table 11 below.

TABLE 11

| Weight Loss | Ex. 26 | Ex. 27 | Ex. 28 | Ex. 29 |
|---|---|---|---|---|
| % by weight | 8.24 | 3.35 | 14.30 | 8.34 |

Examples 30-35 (Effect of Chlorinated Wax on Ozone Degradation)

Carbon-black containing rubber compositions were prepared according to the formulations provided in Table 12 utilizing either a chlorinated wax or a conventional wax. The compositions were prepared in a manner similar to Examples 1-6, using a two-stage mixing procedure as disclosed in Table 1A. The calculated amount of chlorine in the final compound is shown in Table 13.

Ozone resistance data as gauged by rubber specimens suspended in chloroform and measured by the procedure described above in paragraph [0112] is reported in Table 14, where the ozone resistance is reported as the percent of weight loss compared to the original compound. Static ozone resistance data and bent loop ozone resistance data are reported in Tables 15 and 16, respectively. In order to obtain these ozone resistance data, samples of the compounds were placed in an ozone-containing chamber (50 pphm $O_3$) at 38° C. for the indicated number of days. A visual inspection of the sample was made after the end of the indicated number of days and a rating was made according to the criteria listed in Tables 15 and 16. For the static ozone test, specimens that are 2.54 cm wide×15 cm long×0.2 cm thick are stretched uniaxially to 12.5% strain and held at that strain for the duration of the test. For the bent loop ozone test, the specimen size is 2.54 cm wide×7.5 cm long×0.2 cm thick. The specimen is folded lengthwise on itself so the two ends touch and a loop is formed between them. The ends are clamped in this position for the duration of the test. Ozone resistance was also measured using a dynamic stress relaxation test during which a sample of each compound was placed in an ozone-containing chamber (50 pphm $O_3$) at either 0° C. or 30° C. for the indicated number of hours. The dynamic stress relaxation specimens have a test area 1.78 mm wide×51 mm long×1.90 to 2.80 mm thick. The test sequence each hour is to unixally stretch the specimens to 30% strain and hold at that strain for 50 minutes. During the remaining 10 minutes of each hour, the specimens are flexed from 0 to 30% strain at a rate of 182 flexes per minute. The hourly sequence is repeated continuously for the duration of the test. A visual inspection of the sample was made after the end of the indicated number of hours and a rating was made according to the criteria listed in Table 17.

TABLE 12

| | Ingredient (phr) | Ex. 30 | Ex. 31 | Ex. 32 | Ex. 33 | Ex. 34 | Ex. 35 |
|---|---|---|---|---|---|---|---|
| Master Batch | Natural rubber[a] | 50 | 50 | 50 | 50 | 50 | 50 |
| | Butadiene rubber[b] | 50 | 50 | 50 | 50 | 50 | 50 |
| | N660 carbon black | 50 | 50 | 50 | 50 | 50 | 50 |
| | Conventional wax[c] | 2.5 | 0 | 0 | 0 | 0 | 0 |
| | C700[d] | 0 | 4.4 | 0 | 0 | 0 | 0 |
| | Chloroflo 40[e] | 0 | 0 | 3.08 | 0 | 0 | 0 |
| | Paroil 150-LV[f] | 0 | 0 | 0 | 3.46 | 0 | 0 |
| | Paroil 10-NR[g] | 0 | 0 | 0 | 0 | 3.06 | 0 |
| | Paroil 63-NR[h] | 0 | 0 | 0 | 0 | 0 | 3.95 |
| Final Batch | ZnO | 3 | 3 | 3 | 3 | 3 | 3 |
| | Stearic acid | 1 | 1 | 1 | 1 | 1 | 1 |
| | TMQ[i] | 1 | 1 | 1 | 1 | 1 | 1 |
| | Naphthenic oil | 10 | 10 | 10 | 10 | 10 | 10 |
| | 6PPD[j] | 2.5 | 2.5 | 2.5 | 2.5 | 2.5 | 2.5 |
| | Sulfur | 2 | 2 | 2 | 2 | 2 | 2 |
| | TBBS[k] | 1 | 1 | 1 | 1 | 1 | 1 |

[a] TSR5 with dirt less than 0.05%.

[b] Diene 600, available from Firestone Polymers of Lake Charles, LA, 96% cis, 1% vinyl, Tg of −110° C., Mooney viscosity (ML1 + 4 at 212° F.) of 50.

[c] Microcrystalline wax blend: 20% microcrystalline and 80% paraffin; melting point ~170° F. (available from Crystal, Inc., United States).

[d] Chlorez 700 chlorinated wax (available from Dover Chemical Corporation, Dover, OH) containing 70-71% by weight chlorine.

[e] Chlorinated long chain paraffin with 20 or more carbons and containing 39-40% by weight chlorine (available from Dover Chemical Corporation, Dover, OH).

[f] Chlorinated long chain paraffin with 20 or more carbons and containing 49-51% by weight chlorine (available from Dover Chemical Corporation, Dover, OH).

[g] Chlorinated medium chain paraffin with 14-17 carbons and containing 40-41% by weight chlorine (available from Dover Chemical Corporation, Dover, OH).

[h] Chlorinated medium chain paraffin with 14-17 carbons and containing 62-64% by weight chlorine (available from Dover Chemical Corporation, Dover, OH).

[i] Polymerized 1,2-dihydro-2,2,4-trimethylquinoline antioxidant.

[j] N-(1,3-dimethylbutyl)-N'-phenyl-p-phenylenediamine antiozonant.

[k] N-tert-butyl-2-benzothiazole-sulfenamide.

TABLE 13

| Chlorine content | Ex. 30 | Ex. 31 | Ex. 32 | Ex. 33 | Ex. 34 | Ex. 35 |
|---|---|---|---|---|---|---|
| Weight % in final compound | 0.0 | 1.8 | 0.7 | 1.0 | 0.7 | 1.4 |
| Chlorine content (phr) in final compound | 0.0 | 3.12 | 1.23 | 1.73 | 1.25 | 2.49 |

TABLE 14

| Weight loss | Ex. 32 | Ex. 33 | Ex. 34 | Ex. 35 | Ex. 36 | Ex. 37 | Ex. 38 |
|---|---|---|---|---|---|---|---|
| % lost (based on original compound weight) | 8.60 | 7.17 | 7.79 | 6.20 | 6.06 | 4.74 | 8.03 |

TABLE 15

| Days in Chamber | Ex. 30 | Ex. 31 | Ex. 32 | Ex. 33 | Ex. 34 | Ex. 35 |
|---|---|---|---|---|---|---|
| 1 | 0 | Small | Small | Small | Small | Small |
| 2 | 0 | Small | Small | Small | Small | Small |
| 3 | 0 | Medium | Medium | Medium | Medium | Medium |
| 4 | 0 | Medium | Medium | Medium | Medium | Medium |
| 7 | 0 | Large | Large | Large | Large | Large |

TABLE 16

| Days in Chamber | Ex. 30 | Ex. 31 | Ex. 32 | Ex. 33 | Ex. 34 | Ex. 35 |
|---|---|---|---|---|---|---|
| 1 | 0 | 0 | 0 | 0 | 0 | 0 |
| 2 | 0 | Fine | Fine | Fine | Fine | Fine |
| 3 | 0 | Fine | Fine | Fine | Fine | Fine |
| 4 | 0 | Fine | Fine | Fine | Fine | Fine |
| 7 | 0 | Fine | Fine | Fine | Fine | Fine |
| 8 | 0 | Small | Small | Small | Small | Small |
| 9 | 0 | Small | Small | Small | Small | Small |
| 10 | 0 | Small | Small | Small | Small | Small |
| 11 | 0 | Small | Small | Small | Small | Small |
| 14 | 0 | medium | medium | medium | medium | medium |

TABLE 17

| Temp/Hours in Chamber | Ex. 30 | Ex. 31 | Ex. 32 | Ex. 33 | Ex. 34 | Ex. 35 |
|---|---|---|---|---|---|---|
| 0° C. | | | | | | |
| 4 hours | 0 | Fine | Fine | Fine | Fine | Fine |
| 24 hours | Fine | Small | Large | Large | Large | Large |
| 30° C. | | | | | | |
| 4 hours | 0 | 0 | Fine | Fine | Fine | Fine |
| 24 hours | Fine | Fine | Small | Fine | Small | Fine |

Based upon a review of the compositions and data in Tables 1-17, it can be seen that the hydrophobicity of rubber surfaces can be altered, either increased or decreased, by the use of halogenated waxes. Examples are the comparisons of Examples 4 and 5 to Examples 1, 2 and 6 in a carbon black reinforced formulation, and the comparisons of Examples 12-15 to Examples 7-11 in a silica reinforced formulation, and the comparisons of Examples 17 and 19 to Example 16 in a carbon black reinforced formulation, and the comparison of Examples 22 and 24 to Example 21 in a silica reinforced formulation. The adhesion of rubber to a substrate both directly and in the presence of a liquid involves a number of physical parameters and is difficult to predict (see B. J. Briscoe in "Polymer Surfaces", D. T. Clark and W. J. Feast, Eds., John Wiley & Sons, New York, 1978, Chapt. 2.) The friction of rubber when sliding against a substrate, both directly and in the presence of a liquid, involves additional physical parameters and is also difficult to predict (see A. Schallamach and K. Grosch in "Mechanics of Pneumatic Tires", S. K. Clark, Ed., U.S. Department of Transportation, Washington, 1981, Chapt. 6). Consequently, the usefulness of contact angle changes induced by the various chlorinated, fluorinated and silicone waxes is in their application as a compounding tool to enhance tire traction. As evidenced in the experiment of Examples 16-20 and the experiment of Examples 21-25, increased skid resistance can be achieved for example through the use of chlorinated waxes and oils as gauged by the BPN. Further usefulness was discovered in the ability of chlorinated waxes to enhance ozone resistance within the bulk rubber. In the experiment of Examples 26-29 and in the experiment of Examples 30-35, the chlorine content of the different waxes differs, and accordingly, the overall chlorine content of the rubber compound differs. The results show that the chlorinated waxes increased the ozone resistance of the rubber compounds, as evidenced by lower weight % losses of all chlorinated Examples in Table 14 and by all but one chlorinated Example in Table 11. The benefits of the chlorinated waxes are in their propensity to enhance ozone resistance of the interior of the rubber, since static and dynamic ozone resistance as measured by surface appearance techniques was not enhanced in the chlorine wax-containing samples (Tables 15 and 16).

Examples 36-44

Carbon-black containing rubber compositions were prepared according to the formulations provided in Table 18 utilizing either a solid chlorinated wax, a liquid chlorinated wax, or a conventional wax. The compositions were prepared in a manner similar to Examples 1-6, using a two-stage mixing procedure as disclosed in Table 1A. The calculated amount of chlorine in the final compound is shown in Table 19.

Following the final batch stage, the rubber compositions were sheeted into specimens of different shapes for each of Examples 36-44, which in turn were respectively used in the different tests with data reported below in Table 20. The specimens were cured at 171° C. for a proper duration as determined by a cure test for the composition from each Example, thereby forming respective differently shaped vulcanizate specimens for each of Examples 36-44. The vulcanizate specimens for Examples 36-44 were subject to various tests, and the results of those tests are provided in Table 20 below.

The dynamic viscoelastic properties of the vulcanizate specimens were measured by three different tests, as described above for Examples 1-6. The second dynamic viscoelastic test was a dynamic strain sweep test performed as described above for Examples 1-6. The third viscoelastic test was a dynamic compression test performed as described above for Examples 1-6. Tensile mechanical properties of the vulcanizate samples were determined as described above for Examples 1-6.

The skid resistance of vulcanized rubber sliders formed from the compositions of Examples 36-44 were tested with a portable British pendulum skid tester (available from Munro Stanley London) on a wet (water) Portland concrete surface. The results are shown in Table 20 and are expressed as the British Pendulum Number (BPN). A higher BPN indicates a higher wet skid resistance. The rubber sliders in this test were either cleaned with organic solvent (isopropanol) or not cleaned prior to the wet skid testing, as indicated in Table 20.

TABLE 18

| | Ingredient (phr) | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|
| Master Batch | Styrene butadiene #1[a] | 100 | 100 | | | | | | | |
| | Styrene butadiene #2[b] | | | 100 | 100 | 100 | 100 | 100 | 100 | 100 |
| | N339 carbon black | 50 | 50 | 50 | 50 | 50 | 50 | 50 | 50 | 50 |
| | Conventional wax[c] | 2 | 0 | 2 | 0 | 0 | 0 | 0 | 0 | 0 |
| | Liquid chlorinated wax #1[d] | 0 | 0 | 0 | 0 | 2.4 | 0 | 0 | 0 | 0 |
| | Paroil 150-LV[e] | 0 | 0 | 0 | 0 | 0 | 2.62 | 0 | 0 | 0 |
| | Paroil 10-NR[f] | 0 | 0 | 0 | 0 | 0 | 0 | 2.4 | 0 | 0 |
| | Paroil 63-NR[g] | 0 | 0 | 0 | 0 | 0 | 0 | 0 | 2.62 | 0 |
| | Chlorinated wax[h] | 0 | 0 | 0 | 0 | 0 | 0 | 0 | 0 | 3.5 |
| | Stearic acid | 2 | 2 | 2 | 2 | 2 | 2 | 2 | 2 | 2 |
| | Antioxidant[i] | 1 | 1 | 1 | 1 | 1 | 1 | 1 | 1 | 1 |
| Final Batch | Zinc oxide | 2.5 | 2.5 | 2.5 | 2.5 | 2.5 | 2.5 | 2.5 | 2.5 | 2.5 |
| | DPG[j] | 0.3 | 0.3 | 0.3 | 0.3 | 0.3 | 0.3 | 0.3 | 0.3 | 0.3 |
| | MBTS[k] | 0.5 | 0.5 | 0.5 | 0.5 | 0.5 | 0.5 | 0.5 | 0.5 | 0.5 |

TABLE 18-continued

| Ingredient (phr) | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|
| TBBS[i] | 0.5 | 0.5 | 0.5 | 0.5 | 0.5 | 0.5 | 0.5 | 0.5 | 0.5 |
| Sulfur | 1.5 | 1.5 | 1.5 | 1.5 | 1.5 | 1.5 | 1.5 | 1.5 | 1.5 |

[a] DURADENE 706 available from Firestone Polymers of Akron, OH, a solution SBR having a bound styrene content of 23.5%, vinyl bond content in the butadiene portion of 14%, Tg of −62° C., viscosity of 55.
[b] DURADENE 739 available from Firestone Polymers of Akron, OH, a tin-coupled solution SBR having a bound styrene content 20.0, vinyl bond content in the butadiene portion of 60%, Tg of −34° C., viscosity of 92.
[c] Microcrystalline wax blend: 20% microcrystalline and 80% paraffin; melting point ~170° F. (available from Crystal, Inc., United States).
[d] Chloroflo 40 (available from Dover Chemical Corporation, Dover, Ohio).
[e] Chlorinated long chain paraffin with 20 or more carbons and containing 49-51% by weight chlorine (available from Dover Chemical Corporation, Dover, OH).
[f] Chlorinated medium chain paraffin with 14-17 carbons and containing 40-41% by weight chlorine (available from Dover Chemical Corporation, Dover, OH).
[g] Chlorinated medium chain paraffin with 14-17 carbons and containing 62-64% by weight chlorine (available from Dover Chemical Corporation, Dover, OH).
[h] Chlorez 700 chlorinated wax (available from Dover Chemical Corporation, Dover, Ohio).
[i] Antioxidant 6PPD.

TABLE 19

| Chlorine content | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|
| Weight % in final compound | 0 | 0 | 0 | 0 | 0.58 | 0.81 | 0.60 | 1.04 | 1.53 |

TABLE 20

| Property | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|
| BPN (edge wiped) | 38.6 | 36.1 | 45.9 | 46.0 | 45.7 | 45.57 | 48 | 48.86 | 47.86 |
| BPN (edge not wiped) | 36.0 | 38.6 | 44.4 | 46.0 | 48.9 | 46.57 | 48 | 49 | 46.71 |
| Viscosity (ML1 + 4) at 130° C. | 43.7 | 48.2 | 44.4 | 49.7 | 46 | 46 | 45.5 | 46.8 | 47.9 |
| Temp. Sweep at 10 Hz | | | | | | | | | |
| peak tan δ (−15° C., 2%) | 0.765 | 0.807 | 0.913 | 0.969 | 0.957 | 0.923 | 0.945 | 0.940 | 0.945 |
| T at peak tan δ (° C.) | −45.9 | −45.9 | −13.9 | −13.9 | −13.9 | −14.0 | −13.9 | −13.9 | −11.9 |
| Strain Sweep at 50° C. & 15 Hz | | | | | | | | | |
| G' at 9.9% (MPa) | 3.46 | 3.11 | 3.99 | 4.02 | 3.77 | 4 | 3.75 | 4.01 | 4.87 |
| tan δ at 9.9% | 0.262 | 0.256 | 0.682 | 0.687 | 0.657 | 0.679 | 0.629 | 0.684 | 0.723 |
| Tensile at RT | | | | | | | | | |
| Mod50% (MPa) | 1.31 | 1.36 | 1.59 | 1.68 | 1.53 | 1.58 | 1.61 | 1.59 | 1.78 |
| Mod300% (MPa) | 11.81 | 12.38 | 15.02 | 16.48 | 15.56 | 15.76 | 15.88 | 15.95 | 18.08 |
| Tb[a] (MPa) | 16.2 | 17.5 | 14.8 | 16 | 15.2 | 17.4 | 16.6 | 16.7 | 15.8 |
| Eb[b] % | 385.3 | 396.3 | 290.6 | 291.6 | 295.8 | 324.3 | 311.5 | 312.4 | 273.7 |

[a] Tension at break
[b] Elongation at break

Examples 45-53

Silica-filled rubber compositions were prepared according to the formulations provided in Table 21 utilizing either a solid chlorinated wax, a liquid chlorinated wax, or a conventional wax. The compositions were prepared in a manner similar to Examples 7-15, using a three-stage mixing procedure as disclosed in Table 4A. The calculated amount of chlorine in the final compound is shown in Table 22.

Following the final batch stage, the rubber compositions were sheeted into specimens of different shapes for each of Examples 45-53, which in turn were respectively used in the different tests with data reported below in Table 23. The specimens were cured at 165° C. for a proper duration as determined by a cure test for the composition from each Example, thereby forming respective differently shaped-vulcanizate specimens for each of Examples 45-53. The vulcanizate specimens for Examples 45-53 were subjected to various tests, and the results of those tests are provided in Table 23 below.

The dynamic viscoelastic properties of the vulcanizate specimens were measured by three different tests, as described above for Examples 1-6. The second dynamic viscoelastic test was a dynamic strain sweep test performed as described above for Examples 1-6. The third viscoelastic test was a dynamic compression test performed as described above for Examples 1-6. Tensile mechanical properties of the vulcanizate samples were determined as described above for Examples 1-6.

The skid resistance of vulcanized rubber sliders formed from the compositions of Examples 45-53 were tested with a portable British pendulum skid tester (available from Munro Stanley London) on a wet (water) Portland concrete surface. The results are shown in Table 23 and are expressed as the British Pendulum Number (BPN). A higher BPN indicates a higher wet skid resistance. The rubber sliders in this test were either cleaned with organic solvent (isopropanol) or not cleaned prior to the wet skid testing, as indicated in Table 23.

TABLE 21

| | Ingredient (phr) | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|---|
| Master Batch | Styrene butadiene #1[a] | 100 | 100 | 0 | 0 | 0 | 0 | 0 | 0 | 0 |
| | Styrene butadiene #2[b] | 0 | 0 | 100 | 100 | 100 | 100 | 100 | 100 | 100 |
| | silica | 52.5 | 52.5 | 52.5 | 52.5 | 52.5 | 52.5 | 52.5 | 52.5 | 52.5 |
| | Black Oil | 10 | 10 | 10 | 10 | 10 | 10 | 10 | 10 | 10 |
| | Conventional wax[c] | 2 | 0 | 2 | 0 | 0 | 0 | 0 | 0 | 0 |
| | Liquid chlorinated wax #1[d] | 0 | 0 | 0 | 0 | 2.4 | 0 | 0 | 0 | 0 |
| | Liquid chlorinated wax #2[e] | 0 | 0 | 0 | 0 | 0 | 2.62 | 0 | 0 | 0 |
| | Liquid chlorinated wax #3[f] | 0 | 0 | 0 | 0 | 0 | 0 | 2.4 | 0 | 0 |
| | Liquid chlorinated wax #4[g] | 0 | 0 | 0 | 0 | 0 | 0 | 0 | 2.62 | 0 |
| | chlorinated wax[h] | 0 | 0 | 0 | 0 | 0 | 0 | 0 | 0 | 3.5 |
| | Stearic acid | 2 | 2 | 2 | 2 | 2 | 2 | 2 | 2 | 2 |
| | Antioxidant[i] | 1 | 1 | 1 | 1 | 1 | 1 | 1 | 1 | 1 |
| Remill | Silica | 2.5 | 2.5 | 2.5 | 2.5 | 2.5 | 2.5 | 2.5 | 2.5 | 2.5 |
| | Silane[j] | 5 | 5 | 5 | 5 | 5 | 5 | 5 | 5 | 5 |
| Final Batch | Zinc oxide | 2.5 | 2.5 | 2.5 | 2.5 | 2.5 | 2.5 | 2.5 | 2.5 | 2.5 |
| | DPG[k] | 1.4 | 1.4 | 1.4 | 1.4 | 1.4 | 1.4 | 1.4 | 1.4 | 1.4 |
| | MBTS[l] | 2 | 2 | 2 | 2 | 2 | 2 | 2 | 2 | 2 |
| | TBBS[m] | 0.7 | 0.7 | 0.7 | 0.7 | 0.7 | 0.7 | 0.7 | 0.7 | 0.7 |
| | Sulfur | 1.5 | 1.5 | 1.5 | 1.5 | 1.5 | 1.5 | 1.5 | 1.5 | 1.5 |

[a]DURADENE 706 available from Firestone Polymers of Akron, OH, a solution SBR having a bound styrene content of 23.5%, vinyl bond content in the butadiene portion of 14%, Tg of −62° C., viscosity of 55.
[b]DURADENE 739 available from Firestone Polymers of Akron, OH, a tin-coupled solution SBR having a bound styrene content 20.0, vinyl bond content in the butadiene portion of 60%, Tg of −34° C., viscosity of 92.
[c]Microcrystalline wax blend: 20% microcrystalline and 80% paraffin; melting point ~170° F. (available from Crystal, Inc., United States).
[d]Chloroflo 40 (available from Dover Chemical Corporation, Dover, Ohio).
[e]Chlorinated long chain paraffin with 20 or more carbons and containing 49-51% by weight chlorine (available from Dover Chemical Corporation, Dover, OH).
[f]Chlorinated medium chain paraffin with 14-17 carbons and containing 40-41% by weight chlorine (available from Dover Chemical Corporation, Dover, OH).
[g]Chlorinated medium chain paraffin with 14-17 carbons and containing 62-64% by weight chlorine (available from Dover Chemical Corporation, Dover, OH).
[h]Chlorez 700 chlorinated wax (available from Dover Chemical Corporation, Dover, Ohio).
[i]Antioxidant 6PPD.
[j]Sulfur-containing organosilane (SI 75).
[k]Diphenyl guanidine.
[l]2,2'-Dithiobis(benzothiazole).
[m]N-tert-butyl-2-benzothiazole-sulfenamide.

TABLE 22

| Chlorine content | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|
| Weight % in final compound | 0 | 0 | 0 | 0 | 0.51 | 0.71 | 0.52 | 0.91 | 1.34 |

TABLE 23

| Property | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|
| BPN (edge wiped) | 41.3 | 45.4 | 48.7 | 50.3 | 51.6 | 50.1 | 51.1 | 51.1 | 50.9 |
| BPN (edge not wiped) | 35.0 | 41.0 | 40.0 | 44.6 | 50.0 | 51.9 | 52.7 | 52.1 | 53.7 |
| Viscosity (ML1 + 4) at 130° C. | 44.3 | 46.8 | 48.4 | 52.5 | 49.7 | 50 | 49 | 49.8 | 51 |
| Temp. Sweep at 10 Hz | | | | | | | | | |
| peak tan δ (−15° C., 2%) | −44 | −44.0 | −12.0 | −12.0 | −12.0 | −12.0 | −14 | −12.0 | −10.0 |
| T at peak tan δ (° C.) | 0.760 | 0.798 | 0.806 | 0.829 | 0.845 | 0.848 | 0.833 | 0.838 | 0.821 |
| Strain Sweep at 50° C. & 15 Hz | | | | | | | | | |
| G' at 9.9% (MPa) | 3.81 | 3.44 | 5.7 | 5.52 | 5.3 | 5.48 | 5.09 | 5.38 | 5.82 |
| tan δ at 9.9% | 0.284 | 0.282 | 0.787 | 0.803 | 0.762 | 0.794 | 0.747 | 0.789 | 0.822 |

TABLE 23-continued

| Property | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|
| Tensile at RT | | | | | | | | | |
| Mod50% (MPa) | 1.70 | 1.69 | 2.06 | 2.1 | 2.07 | 2.03 | 2.02 | 2.02 | 2.17 |
| Mod300% (MPa) | 7.79 | 7.90 | 9.92 | 10.53 | 10.23 | 9.95 | 9.86 | 9.83 | 11.11 |
| Tb$^a$ (MPa) | 14.8 | 15.6 | 13.8 | 13.7 | 14.1 | 14.3 | 13.6 | 15.3 | 13 |
| Eb$^b$ % | 312.9 | 316.7 | 254.8 | 241.5 | 252.9 | 260.8 | 252.4 | 274.5 | 223.8 |

$^a$Tension at break
$^b$Elongation at break

Analyzing the data provided in Tables 20 and 23, when the rubber slider surface was not cleaned prior to testing, the compounds containing chlorinated wax (regardless of type of reinforcing filler and type of chlorinated wax—liquid or solid) exhibit the most prominent enhancement in wet skid resistance as compared to the control compounds containing conventional wax. Comparing the compounds containing solid chlorinated wax to those containing liquid chlorinated wax shows no obviously higher loss tangent at 50° C., but does show some improvement in wear resistance to the constant-slip Lambourn wear testing.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

As used in the description of the invention and the appended claims, the singular forms "a," "an," and "the" are intended to include the plural forms as well, unless the context clearly indicates otherwise.

All references incorporated herein by reference are incorporated in their entirety unless otherwise stated.

What is claimed is:

1. A tire comprising a tire tread, the tire tread prepared from a rubber composition comprising:
   (a) at least one conjugated diene-containing polymer or copolymer comprising at least one conjugated diene monomer and optionally at least one vinyl-containing monomer;
   (b) at least one filler in an amount of 30 to 100 phr wherein at least a majority of the filler is carbon black, silica, or a combination thereof;
   (c) a curative package; and
   (d) from 0.2 to 10 phr of at least one halogenated hydrocarbon wax.

2. The tire of claim 1, wherein the at least one halogenated hydrocarbon wax of (d) comprises at least one fluorinated hydrocarbon wax in an amount of 0.5 to 5 phr.

3. The tire of claim 1, wherein the at least one halogenated hydrocarbon wax of (d) comprises at least one chlorinated hydrocarbon wax in an amount of 0.5 to 5 phr.

4. The tire of claim 1, wherein the at least one halogenated hydrocarbon wax of (d) comprises at least one fluorinated hydrocarbon wax comprising 0.2% to 70% by weight fluorine based on the total weight of the wax.

5. The tire of claim 1, wherein the at least one halogenated hydrocarbon wax of (d) comprises a fluorinated paraffin wax.

6. The tire of claim 1, wherein the at least one halogenated hydrocarbon wax of (d) is at least one fluorinated hydrocarbon wax that is solid at temperatures from 20 ° C. to 25° C.

7. The tire of claim 1, wherein the at least one halogenated hydrocarbon wax of (d) is at least one chlorinated hydrocarbon wax comprising 35% to 75% by weight chlorine based on the total weight of the wax.

8. The tire of claim 1, wherein the at least one halogenated hydrocarbon wax of (d) comprises a chlorinated paraffin wax.

9. The tire of claim 1, wherein the at least one halogenated hydrocarbon wax of (d) comprises a chlorinated hydrocarbon wax that is solid at temperatures from 20° C. to 25° C.

10. The tire of claim 1, wherein the at least one halogenated hydrocarbon wax of (d) comprises a fluorinated hydrocarbon wax that is solid at temperatures from 20° C. to 25° C.

11. The tire of claim 2, wherein the rubber composition further comprises a conventional wax selected from the group consisting of a microcrystalline wax, a paraffin wax, and combinations thereof.

12. The tire of claim 1, wherein the at least one conjugated diene polymer or copolymer is derived from a conjugated diene monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, optionally in combination with a vinyl aromatic monomer selected from the group consisting of styrene, α-methylstyrene, p-methylstyrene, o-methylstyrene, p-butylstyrene, vinylnaphthalene, and combinations thereof.

13. The tire of claim 1, wherein the at least one filler further comprises clay, metal oxide, and combinations thereof.

14. The tire of claim 1, wherein the at least one conjugated diene-containing polymer or copolymer comprising at least one conjugated diene monomer and optionally at least one vinyl-containing monomer is selected from the group consisting of polybutadiene, styrene-butadiene copolymer, polyisoprene, natural rubber, and combinations thereof.

15. The tire of claim 1, wherein a rubber formed from the rubber composition exhibits an adjusted surface hydrophobicity or hydrophilicity as measured by a contact angle with water different from that of a rubber formed from a comparative composition, wherein the comparative composition is the same as the composition of any one of claims 1-2, 3 except that the comparative composition contains a conventional wax instead of (d) and the conventional wax is present in the same amount as (d).

16. The tire of claim 1, wherein (d) is selected from the group consisting of chlorinated hydrocarbon wax, brominated hydrocarbon wax, iodated hydrocarbon wax, fluorinated hydrocarbon wax, and combinations thereof.

17. The tire of claim 1, wherein the 0.2 to 10 phr of at least one halogenated wax is selected from the group consisting of chlorinated hydrocarbon wax that is solid at temperatures from 20° C. to 25° C., brominated hydrocarbon wax, iodated hydrocarbon wax, fluorinated hydrocarbon wax, and combinations thereof.

\* \* \* \* \*